US012746905B2

(12) United States Patent
Leiber et al.

(10) Patent No.: US 12,746,905 B2

(45) Date of Patent: Sep. 29, 2026

(54) BRAKE SYSTEM AND METHOD FOR CONTROLLING A BRAKE SYSTEM

(71) Applicant: IPGATE AG, Pfäffikon (CH)

(72) Inventors: Heinz Leiber, Oberriexingen (DE); Thomas Leiber, Rogoznica (HR)

(73) Assignee: IPGATE AG, Pfaffikon (CH)

( * ) Notice: Subject to any disclaimer, the term of this patent is extended or adjusted under 35 U.S.C. 154(b) by 399 days.

(21) Appl. No.: 17/795,790

(22) PCT Filed: Jan. 27, 2021

(86) PCT No.: PCT/EP2021/051788

§ 371 (c)(1), (2) Date: Jul. 27, 2022

(87) PCT Pub. No.: WO2021/151910

PCT Pub. Date: Aug. 5, 2021

(65) Prior Publication Data

US 2023/0053950 A1 Feb. 23, 2023

(30) Foreign Application Priority Data

Jan. 28, 2020 (DE) ..................... 10 2020 101 988.2
Feb. 3, 2020 (DE) ..................... 10 2020 102 590.4

(51) Int. Cl.
*B60T 17/22* (2006.01)
*B60T 13/74* (2006.01)

(52) U.S. Cl.
CPC .......... *B60T 17/221* (2013.01); *B60T 13/745* (2013.01); *B60T 2210/124* (2013.01); (Continued)

(58) Field of Classification Search
CPC ................. B60T 13/745; B60T 17/221; B60T 2210/124; B60T 2270/402; B60T 2270/408; B60T 2270/416
See application file for complete search history.

(56) References Cited

U.S. PATENT DOCUMENTS 8,864,244 B2 10/2014 Leiber et al.
10,486,665 B2 * 11/2019 Tanimoto ............. B60T 8/1761
(Continued)

FOREIGN PATENT DOCUMENTS

CN 110386122 A 10/2019
DE 102009033499 A1 1/2010
(Continued)

OTHER PUBLICATIONS

Office Action issued Sep. 22, 2020 in DE Application No. 10 2020 102 590.4.
(Continued)

*Primary Examiner* — Vishal R Sahni

(74) *Attorney, Agent, or Firm* — Naschitz, Brandes, Amir & Co.; Jeffrey W. Gluck

(57) ABSTRACT

A brake system and a method for controlling a brake system. The brake system may include a first module having a first pressure supply unit with an electromotive drive, an optional second pressure supply unit and a first control device for controlling the first pressure supply unit; a second module having a third pressure supply unit, isolation valves and brake-pressure-adjusting valves, and a second control device for controlling the brake-pressure-adjusting valves; and a detection unit for detecting a first case of error. The brake system is designed such that, in the first case of error, in order to provide an ABS function and/or a yaw torque intervention, it implements a (wheel-specific and/or selective) adjustment of the pressures in the wheel brakes by actuating at least one of the brake-pressure-adjusting valves of the second module and/or the isolation valves of the second module and the first pressure supply unit.

23 Claims, 9 Drawing Sheets

Figure 1A:
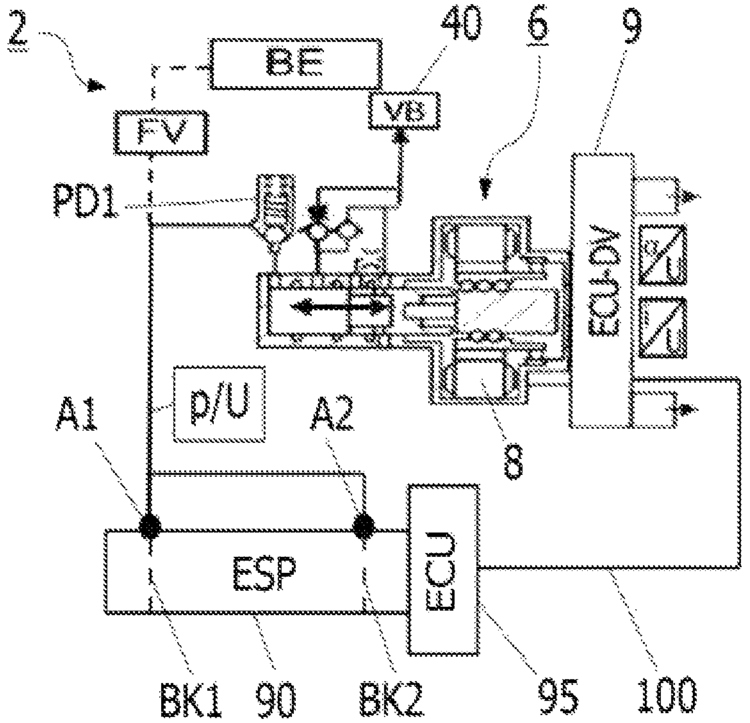

(52) U.S. Cl.
CPC ... *B60T 2270/402* (2013.01); *B60T 2270/408* (2013.01); *B60T 2270/416* (2013.01)

(56) References Cited

U.S. PATENT DOCUMENTS

| | | | |
|---|---|---|---|
| 11,981,304 B2 | 5/2024 | Friedrich et al. | |
| 2016/0325719 A1 | 11/2016 | Linhoff et al. | |
| 2016/0339885 A1 | 11/2016 | Linhoff et al. | |
| 2017/0341631 A1* | 11/2017 | Strehle | B60T 7/04 |
| 2018/0334146 A1 | 11/2018 | Feigel | |
| 2025/0065857 A1 | 2/2025 | Leiber et al. | |
| 2025/0196836 A1 | 6/2025 | Leiber et al. | |
| 2025/0242790 A1 | 7/2025 | Leiber et al. | |

FOREIGN PATENT DOCUMENTS

| | | | | |
|---|---|---|---|---|
| DE | 102012210809 A1 | 1/2013 | | |
| DE | 102014205645 A1 | 10/2014 | | |
| DE | 102013227066 A1 | 6/2015 | | |
| DE | 102014212537 A1 | 12/2015 | | |
| DE | 102016201047 A1 | 8/2016 | | |
| DE | 102016105232 A1 | 9/2017 | | |
| DE | 102016208966 A1 | 11/2017 | | |
| DE | 102016211982 A1 * | 1/2018 | | |
| DE | 102017200955 A1 | 7/2018 | | |
| DE | 102017003654 A1 | 10/2018 | | |
| DE | 102017113563 A1 * | 12/2018 | B60T 13/142 | |
| DE | 102018010168 A1 | 7/2020 | | |
| EP | 2225133 B1 | 2/2014 | | |
| EP | 2744691 B1 | 7/2015 | | |
| JP | H02-200558 A | 8/1990 | | |
| JP | 2000-001162 A | 1/2000 | | |
| JP | 2001-239929 A | 9/2001 | | |
| JP | 2002120715 A | 4/2002 | | |
| JP | 2004-306914 A | 11/2004 | | |
| JP | 2008-189100 A | 8/2008 | | |
| JP | 2015-085834 A | 5/2015 | | |
| JP | 2018024307 A | 2/2018 | | |
| JP | 2018-508415 A | 3/2018 | | |
| WO | 2009065709 A1 | 5/2009 | | |
| WO | 2009083216 A2 | 7/2009 | | |
| WO | 2010088920 A1 | 8/2010 | | |
| WO | 2011098178 A1 | 8/2011 | | |
| WO | 2012019802 A1 | 2/2012 | | |
| WO | 2013023953 A1 | 2/2013 | | |
| WO | 2018234387 A1 | 12/2018 | | |
| WO | WO-2019030005 A1 * | 2/2019 | B60T 13/167 | |
| WO | 2019201619 A1 | 10/2019 | | |
| WO | 2020224814 A1 | 11/2020 | | |
| WO | WO-2020229484 A1 * | 11/2020 | B60T 11/26 | |

OTHER PUBLICATIONS

Int'l Search Report and Written Opinion issued May 11, 2021 in Int'l Application No. PCT/EP2021/051788, English translation of Int'l Search Report only.

Office Action issued on Jan. 27, 2025, in JP Application No. 2022545056.

Extended European Search Report issued Apr. 14, 2025 in EP Application No. 25150506.1, with English translation of the Search Report.

Office Action issued on Sep. 25, 2025 in JP Application No. 2022545056.

Office Action in Chinese Pat. App. No. 202180015385.7, issued on Feb. 7, 2026.

Office Action in Japanese Pat. App. No. 2025-109730, issued Jun. 19, 2026.

Office Action in Japanese Pat. App. No. 2025-109731, issued Jun. 19, 2026.

* cited by examiner

BRAKE SYSTEM AND METHOD FOR CONTROLLING A BRAKE SYSTEM

CROSS-REFERENCE TO RELATED APPLICATION

This application is a Section 371 of International Application No. PCT/EP2021/051788, filed Jan. 27, 2021, which was published in the German language on Aug. 5, 2021 under International Publication No. WO 2021/151910 A1, which claims priority under 35 U.S.C. § 119(b) to German Patent Application No. 10 2020 101 988.2, filed Jan. 28, 2020 and German Patent Application No. 10 2020 102 590.4, filed Feb. 3, 2020, the disclosures of which are incorporated herein by reference.

The invention relates to a brake system and to a method for controlling a brake system.

The trend toward vehicles which are configured for autonomous driving in terms of the brake system places high demands in terms of the failsafe design, on the one hand, and redundant functions, for example in terms of brake pressure generation, voltage supply and computer functions, on the other hand.

So-called one-box and two-box systems are usually favored. These are composed of an electric brake booster (BKV), a so-called e-booster, and an electronic stability control system (ESP/ESC).

The known solutions have relatively large installation lengths and/or a high weight.

Described in WO2011/098178 as well as DE 10 2014 205 645 A1 (hereunder referred to as variant A, or as follower booster or e-booster) is a solution having a coaxial drive in which an electric motor by way of a gear mechanism and piston acts on the master cylinder piston (HZ piston). The BKV control is performed by way of an electric element and reaction disk as a so-called follower booster, the pedal travel is a function of the brake pressure and the volumetric absorption of the brake system, this requiring long pedal travels in the event of fading or brake circuit failure.

WO2009/065709 shows an e-booster, likewise having a follower booster function (hereunder referred to as variant B, or as follower booster or e-booster). The BKV control here is performed by way of a pedal travel and/or by way of a pedal pressure, thus the pressure used for activating the pedal. A separate pressure supply with an electric motor and plunger acts on the HZ piston by way of the booster piston.

WO2012/019802 shows an assembly similar to WO2011/098178, having a coaxial drive in which an electric motor by way of a gear mechanism and piston acts on the HZ piston (hereunder referred to as variant C). An additional piston/cylinder unit is used here, which acts on a travel simulator piston. In this way, the pedal travel is independent of, for example, fading and brake circuit failure. However, the complexity is high and the installation length is large.

DE 10 2009 033 499 shows a brake booster having an additional ESP unit with hydraulic activation of the booster piston and an external pressure supply (hereunder also referred to as variant D). This assembly having four or five pistons and six solenoid valves (MV) is complex and unfavorable in terms of the installation length. The travel simulator (WS), which does not act hydraulically, lies within the piston/cylinder unit that is disposed upstream of the master cylinder and can neither be damped nor switched by way of a solenoid valve (MV).

All solutions mentioned above have a redundant brake booster function because the braking function in the event of a failure of the BKV motor is guaranteed by the ESP unit with a pump similar to the assistance functions by a vacuum BKV in the autonomous driving mode.

In the event of a failure of the ESP motor, the ABS can continue to function by way of the possibility of pressure modulation by the motor of the brake booster, as described in WO2010/088920, in that the piston of the master brake cylinder is moved in a reciprocating manner for building up and dissipating pressure. If the brake booster is used in combination with an ESP unit with the typical valve circuit of the ESP unit, as outlined in detail for example in FIG. 1 of DE 10 2014 205 645 A1, the pressure can be built up and dissipated by way of the inlet valves which are open when non-energized (reference signs 32*a*, 32*b*, 34*b*, 34*a* of FIG. 1 of DE10 2014 205 645 A1) and switchover valves (USV) (reference signs 30*a*, 30*b* of FIG. 1 of DE 10 2014 205 645 A1), i.e. a common pressure control for all four wheels can be implemented, this not resulting in an optimum stopping distance.

All one-box systems known to date have a so-called travel simulator (in particular for brake-by-wire systems), so as to implement a progressive pedal travel characteristic.

The known systems with an e-booster and ESP have only one redundancy in the pressure supply, i.e. in the event of a failure of the e-booster there is a redundant pressure supply with a redundant output for brake boosting by the ESP. Higher requirements in terms of safety are not taken into account.

The packaging, thus an arrangement of the individual components of the brake system so as to form a ready-to-install unit and an installation volume of this unit are of great importance. In particular in the case of brake systems that are used in motor vehicles which are configured for semi-automatic or even fully automatic driving, many variants, for example with a tandem master (brake) cylinder or a single master (brake) cylinder have to be taken into account. Examples of known packaging variants are an arrangement of a pressure supply unit perpendicular to an axis of the master (brake) cylinder (as described in EP 2 744 691, for example) or an arrangement of the pressure supply unit parallel to the axis of the master (brake) cylinder (as described in DE 10 2016 105 232, for example). The latter is distinguished in particular by a smaller installation width in comparison to the first-mentioned packaging variant.

Proceeding from the prior art, it is an object of the present invention to specify an improved brake system.

The invention is in particular based on the object of achieving a brake system for the use in autonomous driving (hereunder also referred to as AD) and/or for electric vehicles/hybrid vehicles having an increasingly high recuperation output (recuperating energy by braking by way of a generator/or drive motor in the generator operation, respectively). Preferably, the weight is minimized and/or the dimensions of the system are reduced and/or the reliability is increased.

A cost-effective brake system for autonomous driving is preferably to be achieved, said brake system meeting all required redundancies and a very high requirement in terms of safety.

Moreover, a function of ABS which is sufficient in terms of the braking distance and stability, as well as a sufficient recuperation function, are to be achieved by the brake system in the event of a failure of ESP.

It is in particular an object of the present invention to specify an improved brake system as well as a method for controlling a brake system having a redundant pressure supply, a very large range of functions and availability, in particular in the event of the failure of a brake circuit, with simultaneously a very short installation length and low costs. Furthermore to be provided is a method which enables a very high degree of availability even in the event of partial failures/leakages.

In terms of the brake system, the object is achieved according to the invention by a brake system having the features of claim 1. In terms of the method, the object is achieved according to the invention by a method having the features of claim 18.

The object focused on the brake system is achieved according to the invention in particular by a brake system having:

a first module, comprising a first pressure supply unit having an electromotive drive, an optional second pressure supply unit and a first control apparatus for controlling the first pressure supply unit, wherein the first module is specified for impinging at least one first brake circuit by way of a first connection point, and at least one second brake circuit by way of a second connection point, with a pressurizing medium, wherein the brake circuits are assigned wheel brakes, a second module, comprising a third pressure supply unit, in particular a motor/pump unit, isolation valves as well as brake pressure adjustment valves, in particular outlet valves and inlet valves, for adjusting a pressure in the wheel brakes, and a second control apparatus for controlling the brake pressure adjustment valves, a detection unit for detecting a first error event, in particular an at least partial failure of the third pressure supply unit, wherein the brake system in the first error event, for providing an ABS function and/or a yaw torque intervention, is specified for implementing a (wheel-individual and/or selective) adjustment of the pressures in the wheel brakes while actuating at least one of the brake pressure adjustment valves of the second module and/or the isolation valves of the second module and the first pressure supply unit.

The pressure supply unit here can generally be understood to mean a unit, in particular a construction unit, of the brake system that provides a brake pressure. The pressure supply unit thus serves for impinging the at least one brake circuit with the pressurizing medium. The third pressure supply unit is preferably an ESP unit of the type described at the outset. The isolation valves here can be configured so as to be bidirectional, i.e. can be hydraulically permeable in two flow directions. Depending on the design embodiment of the brake system and/or also of the field of application of the brake system, the optional second pressure supply unit can be configured as an electronic pedal or as a central computer.

The at least partial failure of the third pressure supply unit here can be understood to mean that the motor/pump unit fails while the other components of the third pressure supply unit are still able to function.

The isolation valves as well as the brake pressure adjustment valves, in particular the pressure buildup valves and pressure dissipation valves (hereunder also referred to as inlet valves EV and outlet valves AV) are in particular configured as solenoid valves. Solenoid valves have been proven advantageous in particular by virtue of the simple actuation capability of said solenoid valves.

In one embodiment the first pressure supply unit in the first error event is controlled in such a manner that said first pressure supply unit when dissipating pressure for providing the ABS braking operation generates a pressure sink having a lower pressure than the pressures in the wheel brakes.

In a further embodiment, at least some of the isolation valves of the first module are disposed and configured for establishing a hydraulic connection between the brake pressure adjustment valves, in particular the outlet valves and the connection points.

The brake system in the first error event, for dissipating pressure in one of the wheel brakes, here is preferably configured for opening the assigned outlet valve.

In one embodiment, at least some of the isolation valves of the first module are disposed and configured for establishing a hydraulic connection between the brake pressure adjustment valves, in particular the outlet valves and the connection points, wherein the brake system in the first error event, for dissipating pressure in one of the wheel brakes, is preferably configured for opening the assigned outlet valve.

A communications link, in particular a bus link, is expediently configured between the first control apparatus and the second control apparatus, wherein the first control apparatus is preferably configured for receiving pressure measurement values of the second module and/or wheel rotational speed signals by way of the communications link. The communications link can alternatively be an Ethernet or Flexray link. Furthermore alternatively, the communications link can also be configured so as to be wireless or as an analog connection, for example for determining a measurement value.

Furthermore alternatively, the communications link, in particular the bus link, can be configured between the first control apparatus and the second control apparatus, wherein the first control apparatus and the second control apparatus are preferably configured for receiving pressure measurement values of the third pressure supply unit and/or wheel rotational speed signals by way of the communication link. In the event of a failure of the communications link, it is possible in this way to perform ABS controlling by way of the data imported by the two control apparatuses. Receiving here can also be understood to mean importing sensor values and signals of this type from one of the control apparatuses by way of the communications link.

In one embodiment, the first control apparatus and/or the second control apparatus and/or a third control apparatus in the first error event are/is configured for controlling the first pressure supply unit and the brake pressure adjustment valves so as to implement wheel-individual and/or brake circuit-individual pressure feedback control in the wheel brakes or the brake circuits. According to the invention, indirect controlling of the actuators, for example valves, can also take place by way of the respective other control apparatus. The third control apparatus can be understood to mean a central control unit, for example.

In a further embodiment, a first isolation valve of the first module is disposed in a first hydraulic line between the first pressure supply unit and the first connection point. Moreover, according to this embodiment a second isolation valve is disposed in a second hydraulic line between the first pressure supply unit and the second connection point. The brake system here is configured to detect a second error event, in particular a total failure of the third pressure supply unit. The total failure here can be understood to mean that all components of the third pressure supply unit have failed and are no longer able to function. Furthermore, the brake system in the second error event is configured to control the first pressure supply unit and the first and second isolation valve, so as to implement at least one brake circuit-individual pressure feedback control in the at least two brake circuits. The controlling here preferably takes place by way of the first control apparatus.

According to one embodiment, the brake system and in particular the first control apparatus is specified to detect a non-homogenous road condition, in particular a p-split situation, and in the second error event and in the detected non-homogenous road condition, is specified to control the first pressure supply unit. This controlling here serves to adjust a target brake pressure in at least one selected brake circuit of the brake circuits, said target brake pressure being determined as a function of a wheel blocking pressure of that wheel brake of the selected brake circuit that has the coefficient of friction that is higher in comparison to the other wheel brake of the selected brake circuit. The non-homogenous road condition here is detected in such a manner that a pressure differential between the two wheel blocking pressures is detected. A non-homogenous road condition is present when this pressure differential has a percentage value of more than 30% or 40%.

In a third error event, in particular in the event of an additional failure of the wheel sensors mentioned above, or in the communication of the wheel rotational speed signals from the second module to the first module, the brake system, in particular the first control apparatus, in one embodiment in the third error event, by means of the first pressure supply unit, is specified for controlling the pressure buildup and the pressure dissipation, so as to implement a single-channel ABS while using wheel rotational speed sensors, and/or in a fourth error event is specified for implementing an intermittent brake by modulating the pressure between two fixedly adjusted pressure levels in both brake circuits. An improved maneuverability and braking performance of the vehicle as compared to the brake systems known in the prior art is thus also achieved in a further error event and an additional failure of further components of the brake system associated therewith.

At least one pressure sensor for detecting a brake pressure within the at least one brake circuit is expediently provided.

In one embodiment the first hydraulic line between the first pressure supply unit and the first connection point is configured without a valve. Moreover, the second hydraulic line between the first pressure supply unit and the second connection point is configured without a valve. Without a valve here can be understood to mean that no valves are disposed in the first or the second hydraulic line between the first pressure supply unit and the first or the second connection point, respectively.

According to a further embodiment, the first module has a rotary pump, in particular a single-circuit 1-piston pump, or a multi-piston pump, for building up pressure and dissipating pressure. Moreover, the first module according to this embodiment comprises a solenoid valve hydraulically connected to a reservoir, as well as at least one optional pressure transducer. The optional pressure transducer for feedback-controlling the pressure buildup and the pressure dissipation is preferably communicatively connected to the first control apparatus.

According to an alternative embodiment, the first pressure supply unit is configured as a gear pump for building up pressure and dissipating pressure. The gear pump is expediently controlled while using a pressure transducer or as a function of a measurement of a current, in particular a phase current i of the electromotive drive of the gear pump, and of an angle $\alpha$ of a rotor of the electromotive drive. In the case of a present pressure transducer, said measurements can be used for providing a redundancy (hot or cold).

Considering the different variants of design configuration of the first pressure supply unit, the latter thus takes into account different variants of configuration.

In a further embodiment, at least one third isolation valve is provided, said third isolation valve being disposed and configured in such a manner that, in a closed state of the third isolation valve, the first brake circuit is hydraulically decoupled from the first and the second pressure supply unit.

Furthermore, the first hydraulic line and/or the second hydraulic line are/is preferably (in each case) connected to a reservoir by way of a suction valve. The suction valves are used such that the third pressure supply unit can convey volumes directly from the reservoir rapidly with minor hydraulic resistances and that the first and the second pressure supply unit during conveying are decoupled as a result of the operation of the third pressure supply unit and are not compromised by the operation.

According to a further design embodiment, an activation element, in particular a brake pedal, is disposed on the second pressure supply unit. The second pressure supply unit here comprises a master brake cylinder having a single piston that is activatable by means of the activation element and has a pressurized chamber as well as a travel simulator connected to the pressurized chamber. Furthermore, the pressurized chamber by way of a switchable solenoid feed valve FV is connected to at least one brake circuit.

As a result of the embodiments of the brake system according to the invention described above, operation taking into account safety aspects is made possible in particular in the error events listed hereunder (in all or a selection of these error events).

Error event 1: failure of the motor of the third pressure supply unit (ESP unit); 4-channel ABS by feedback control by way of valves and first pressure supply unit;

Error event 2: complete failure of the third pressure supply unit (ESP unit); 2-channel ABS with “select-low”/“select-high” feedback control atypical of the normal operation;

Error event 3: complete failure of the third pressure supply unit (ESP unit), wheel rotational speed sensors are available in a redundant manner and are imported into the first module directly from the wheel brakes; establishment of a 1-channel ABS;

Error event 4: complete failure of the third pressure supply unit (ESP unit) and failure of the wheel rotational speed sensors; establishment of an automatic intermittent brake.

Alternatively or additionally to the ABS control in the error event 1, a yaw torque control can furthermore take place in this error event so that a brake pressure is generated in selectively selected wheels.

In terms of the method, the object is achieved in particular by a method for controlling a brake system, in particular the brake system described above, said method comprising the steps:

- controlling a first pressure supply unit of a first module by means of a first control apparatus in a normal operation,
- controlling a multiplicity of brake pressure adjustment valves in a second module in a normal operation,
- detecting a first error event, in particular a partial failure of the second module,
- controlling the brake system in the first error event in such a manner that for providing an ABS braking operation and/or a yaw torque intervention a (wheel-individual and/or selective) adjustment of the pressures in the wheel brakes takes place while using at least one, in particular bidirectional, isolation valve of the second module and the first pressure supply unit.

In one embodiment, the method furthermore comprises the steps:

- detecting a second error event, in particular a total failure of the third pressure supply unit, controlling the first pressure supply unit and at least two isolation valves of the first module in such a manner that, in the second error event, a brake circuit-individual pressure feedback control is implemented in the at least two brake circuits.

According to a further embodiment, the method comprises the steps:

detecting a non-homogenous road condition, in particular a p-split situation, controlling the first pressure supply unit in the second error event in such a manner that in non-homogenous road condition that wheel brake of a selected brake circuit that has the coefficient of friction that is higher in comparison to the other wheel brake is utilized for determining a target brake pressure.

In a further embodiment, the method moreover comprises the steps:

detecting a third error event, in particular a total failure of the third pressure supply unit and a failure of wheel sensors, controlling the first pressure supply unit in the third error event in such a manner that a 1-channel ABS is implemented, or in a fourth error event an intermittent brake is implemented by modulating the pressure between two predefined pressure levels in at least one of the brake circuits (BK1, BK2).

According to an alternative embodiment, the method furthermore comprises the steps:

determining a first wheel blocking pressure on a first wheel brake which is assigned to one of the two brake circuits;

determining a second wheel blocking pressure on a wheel brake which is assigned to the same brake circuit, wherein a non-homogenous road condition is detected when the first and the second wheel blocking pressure differ by more than 30 percent.

Advantages similar to those that have been described in conjunction with the brake system are derived for the method.

Figure 1B:
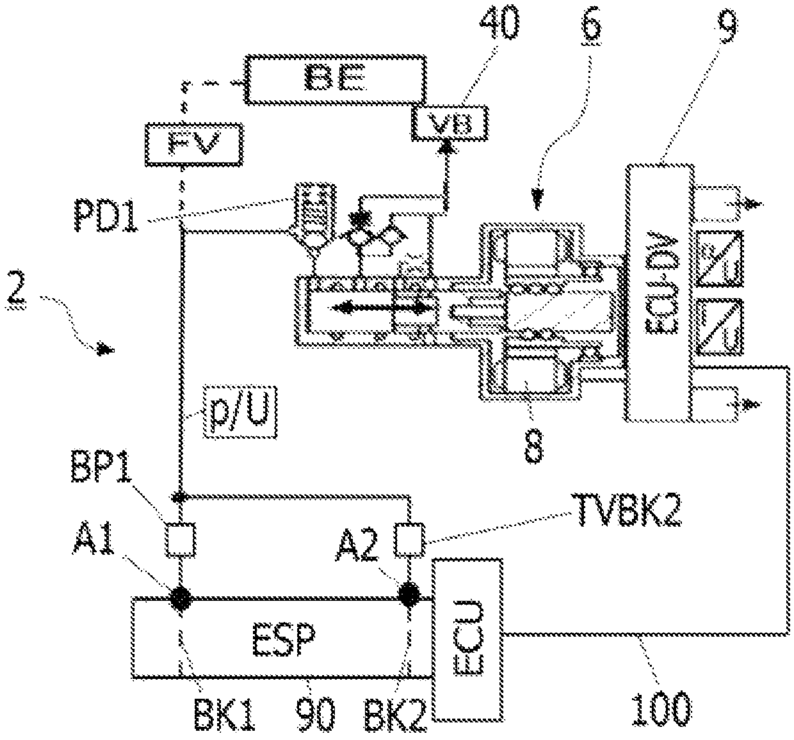
Figure 2:
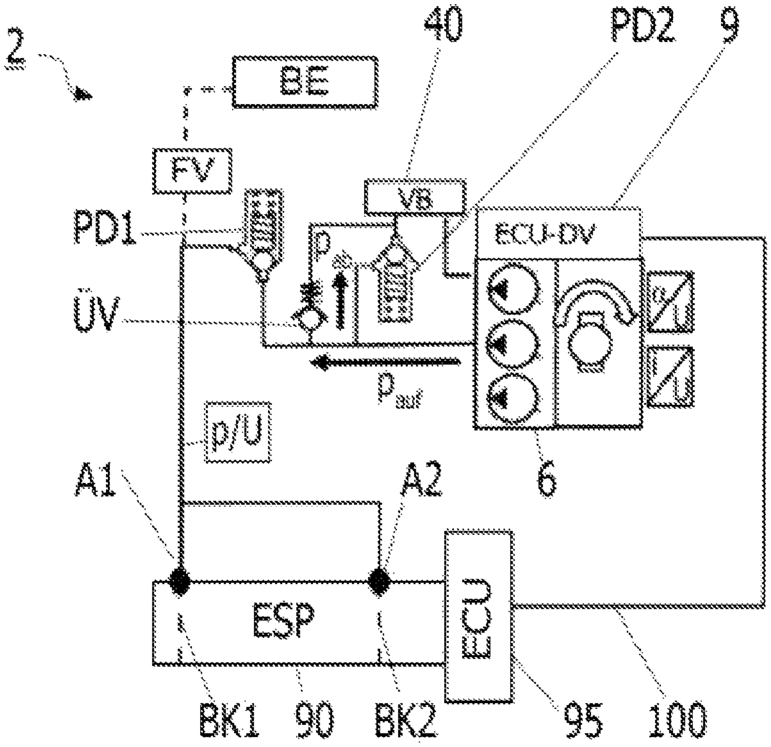
Figure 3:
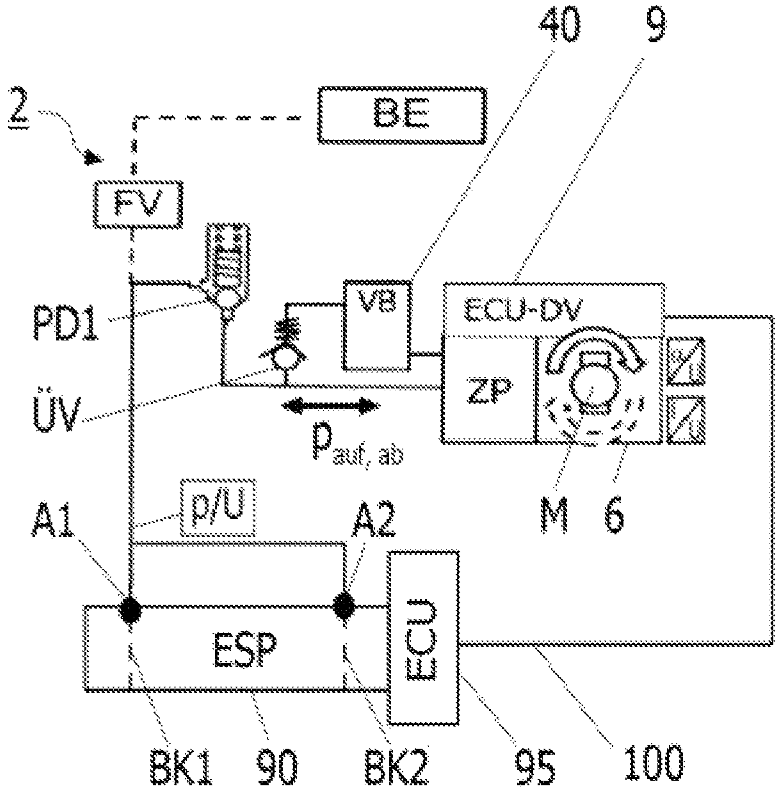
Figure 4:
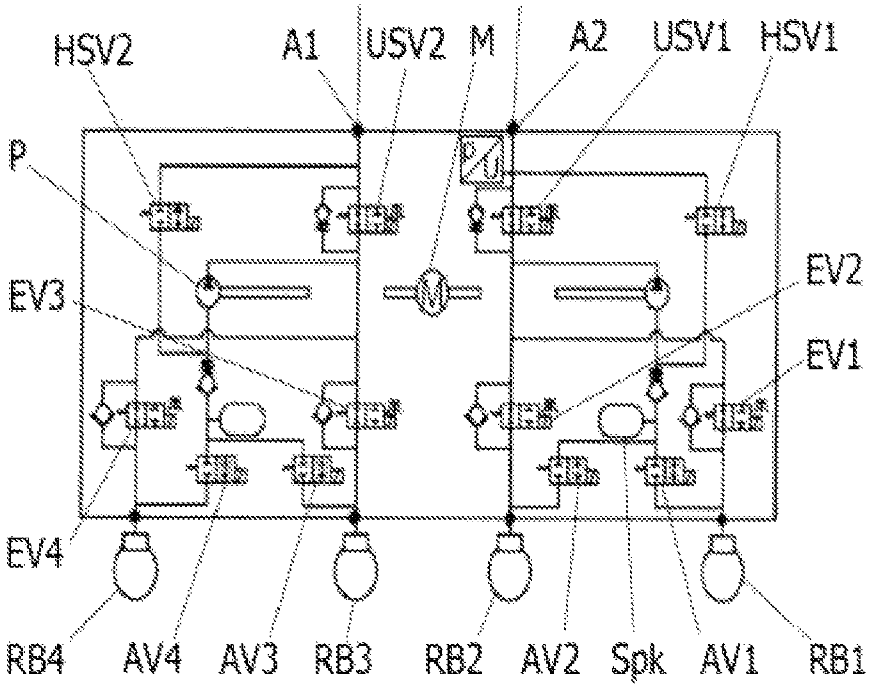
Figure 5:
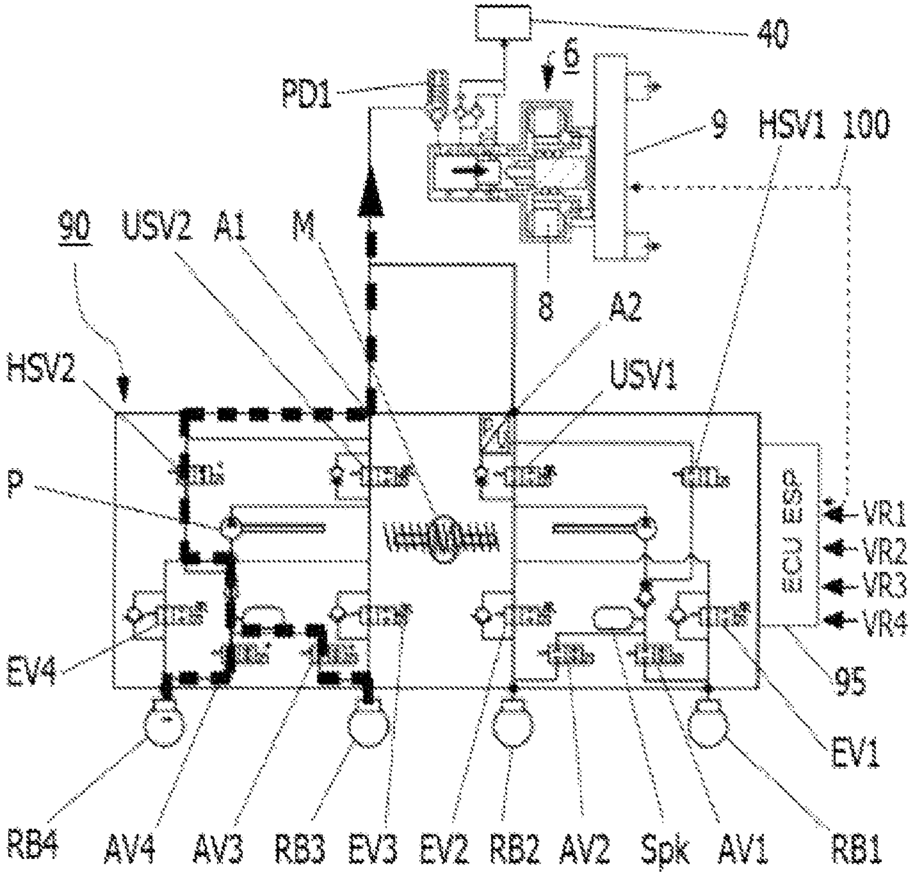
Figure 6:
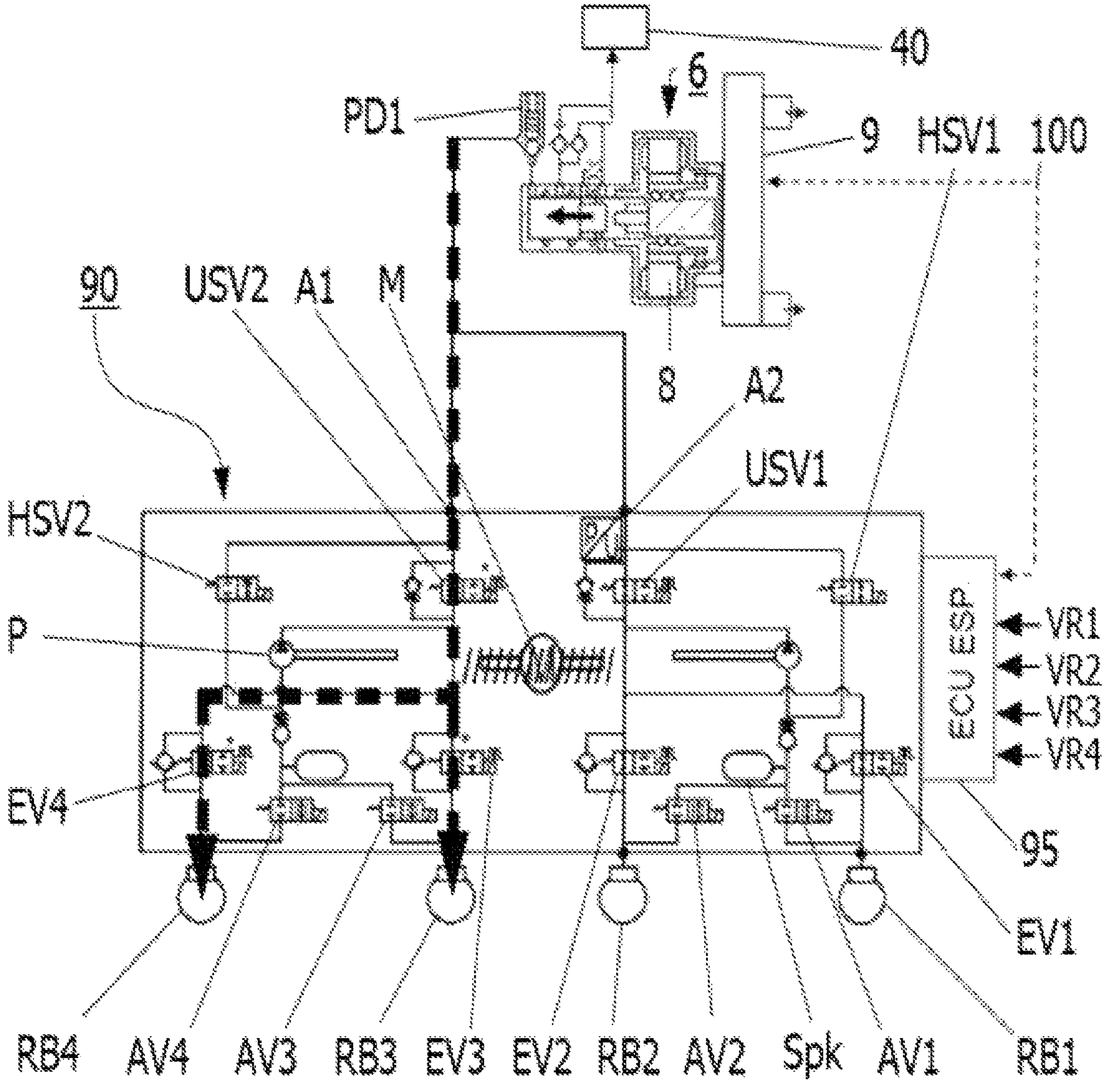
Figure 7A:
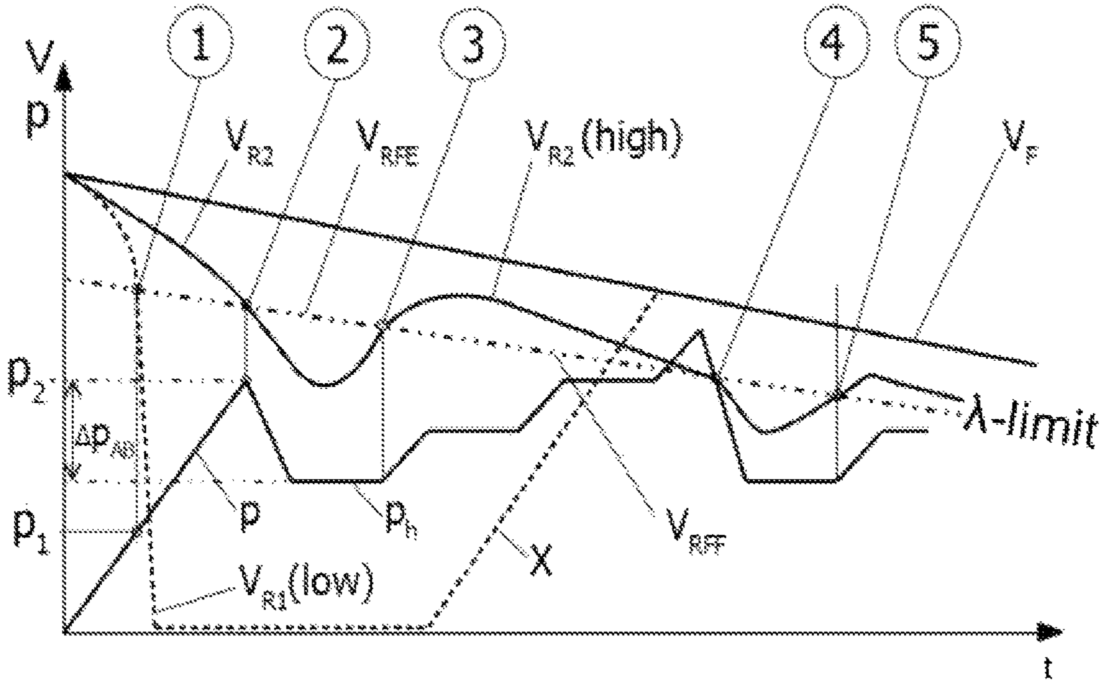
Figure 7B:
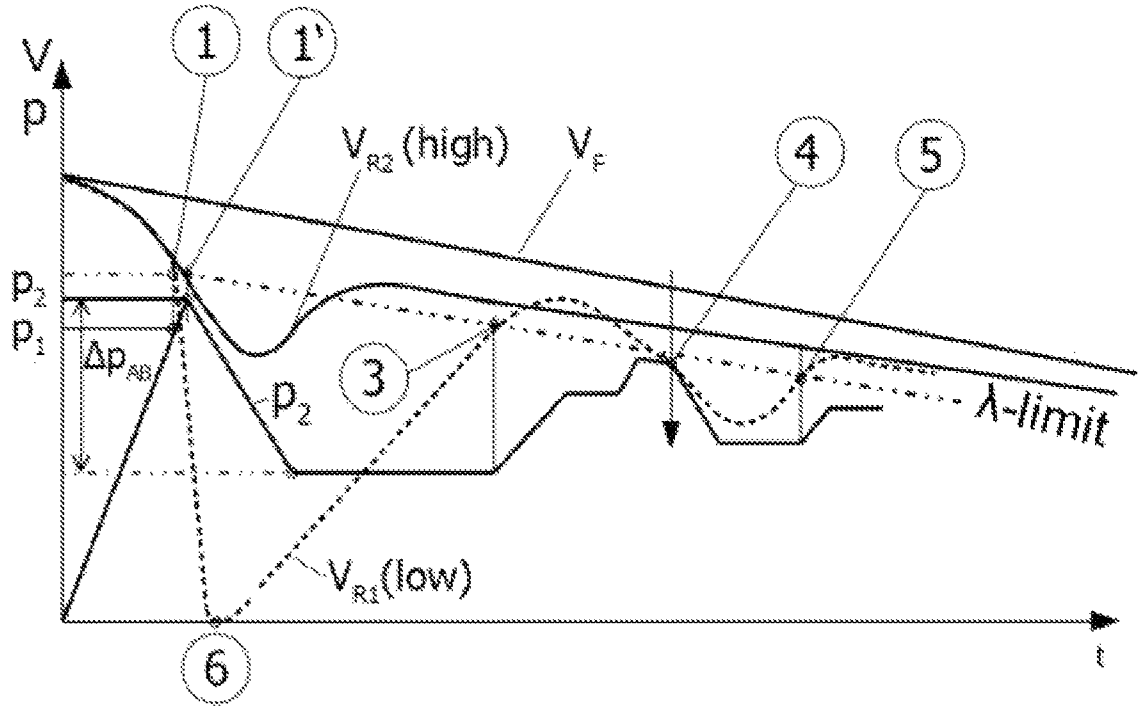
Figure 8:
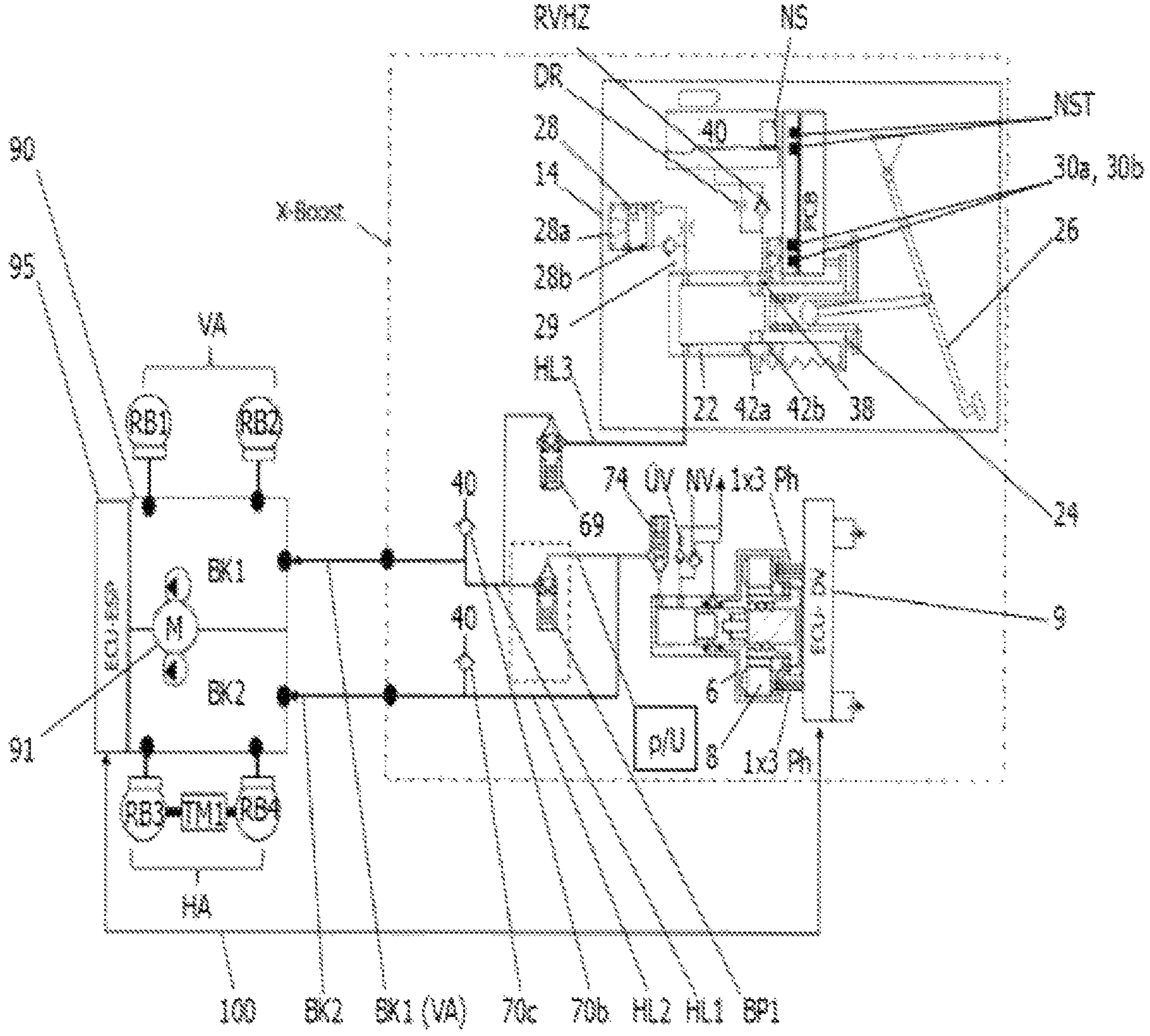
Figure 9:
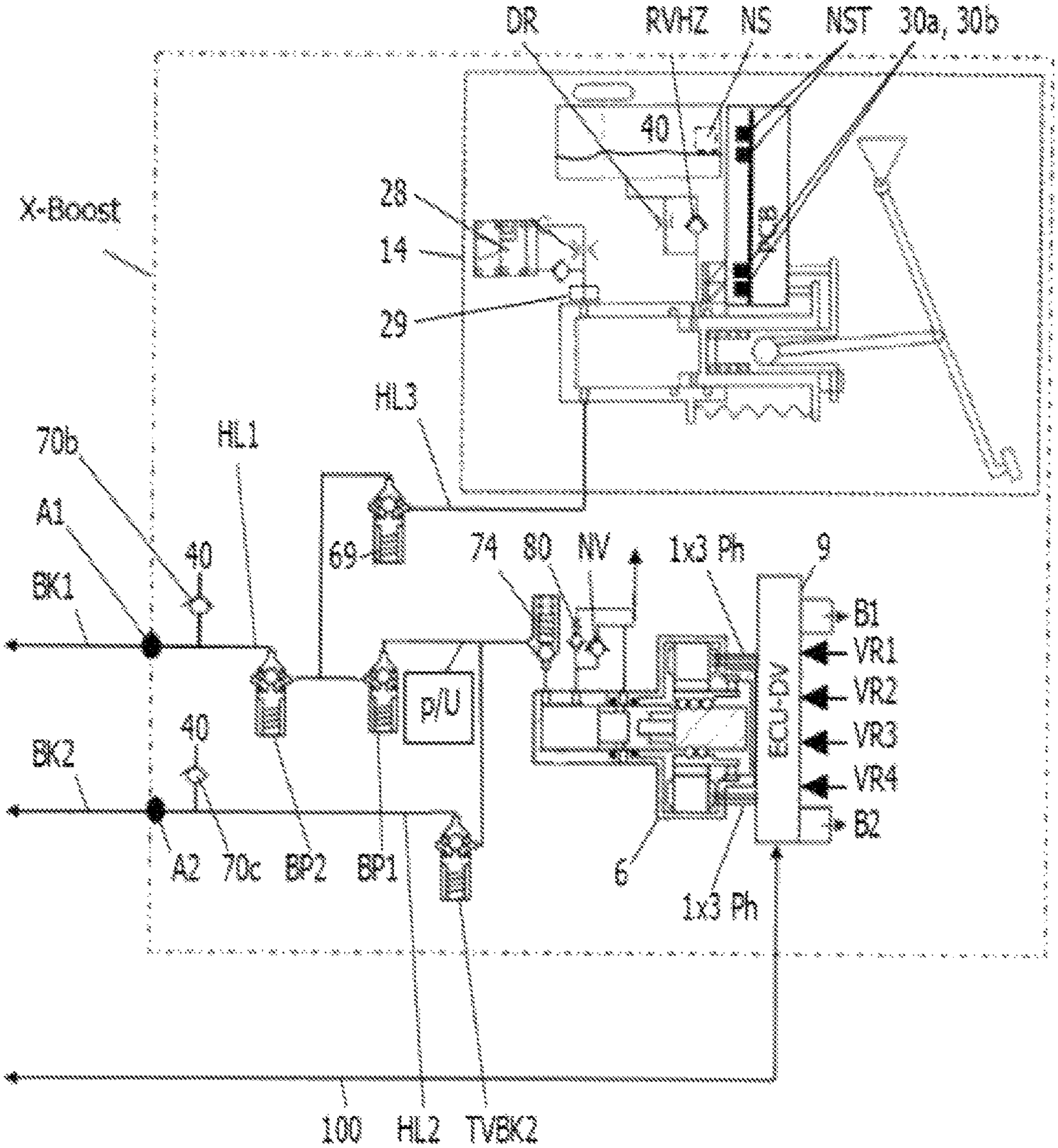
Figure 10:
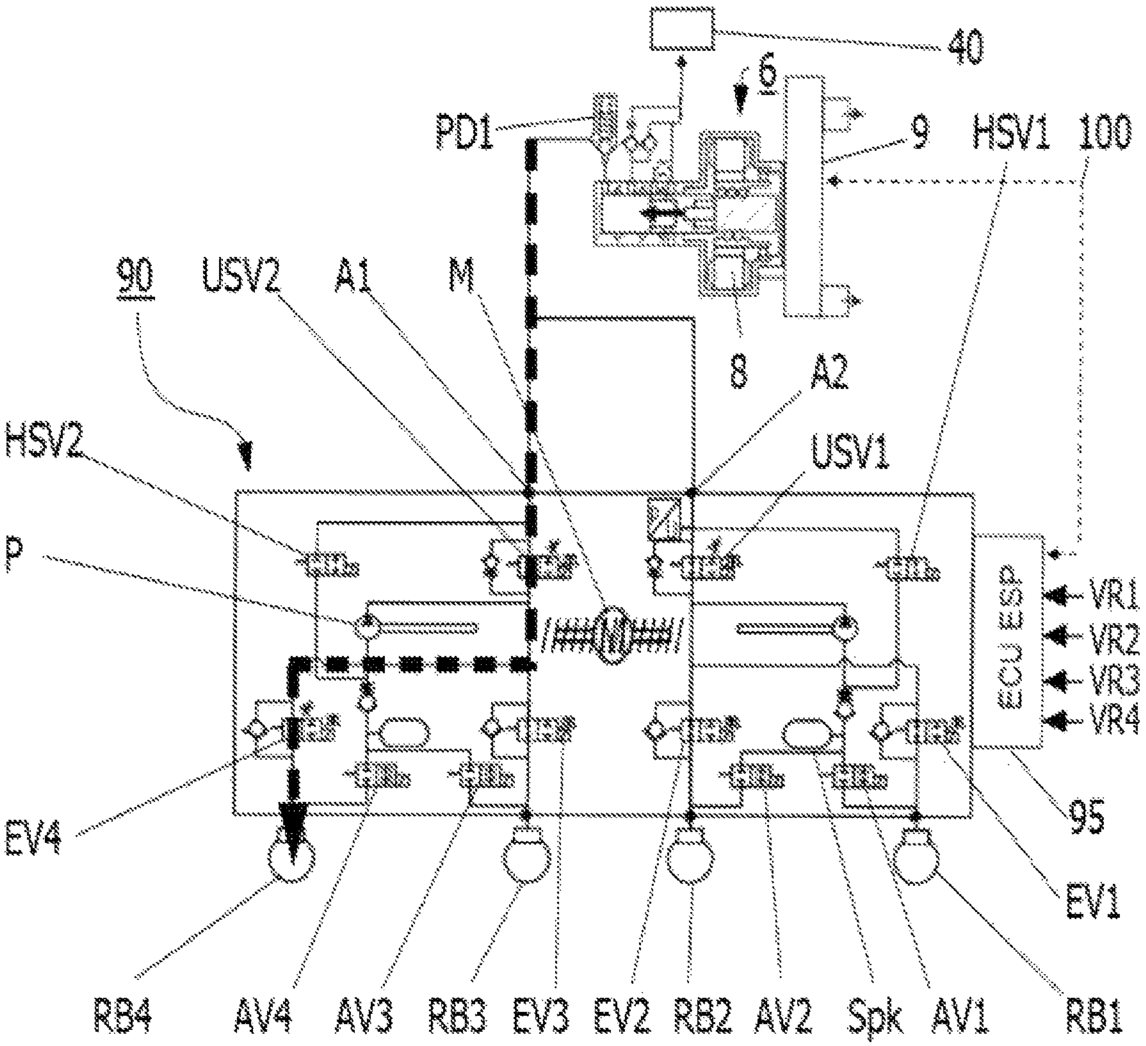
Figure 11:
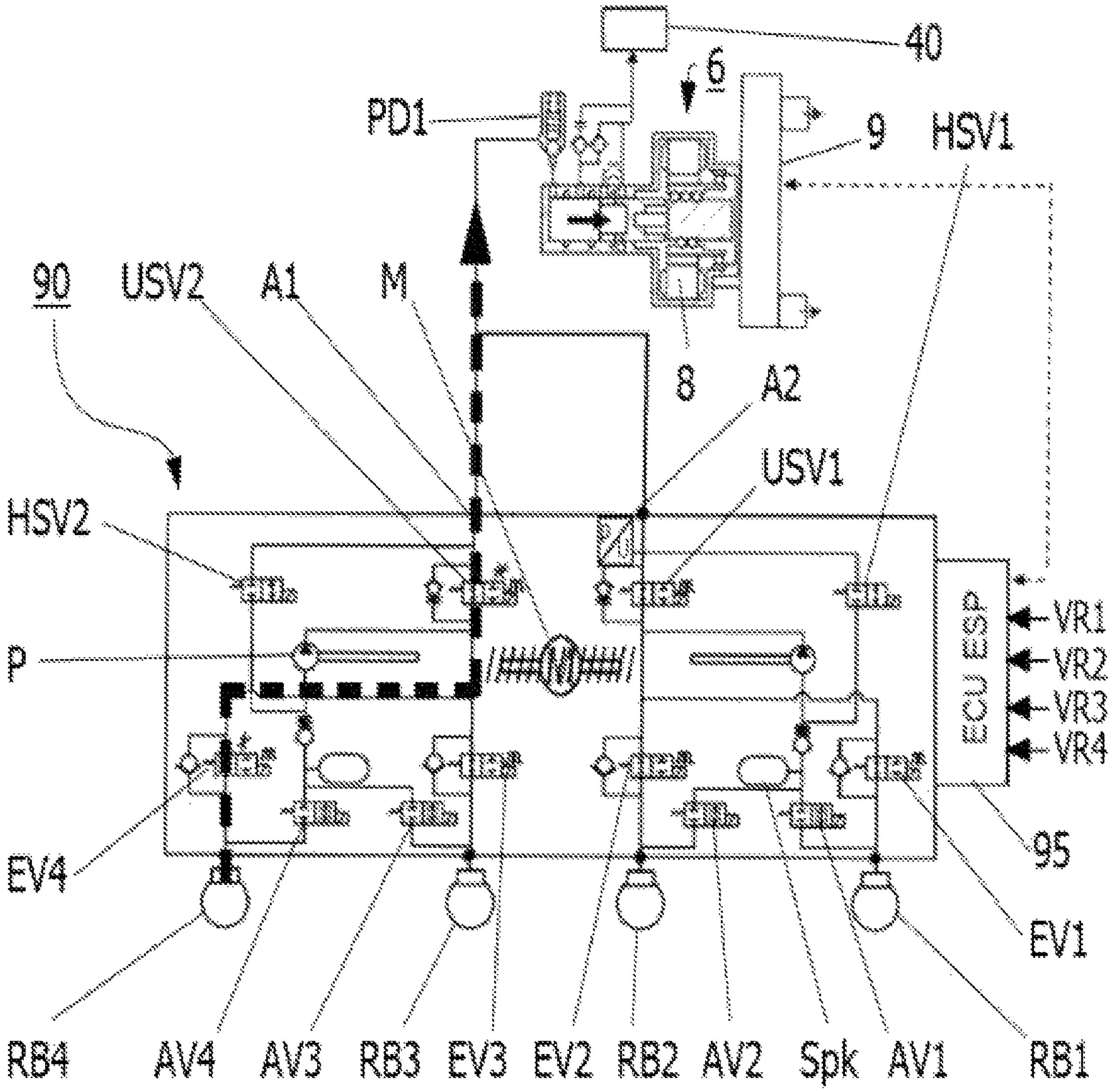

Exemplary embodiments of the invention will be explained in more detail hereunder by means of the figures. In the figures, in some instances in a highly simplified illustration:

FIG. 1*a* shows a circuit diagram of a first exemplary embodiment of the brake system having a first pressure supply unit according to a first embodiment, FIG. 1*b* shows a circuit diagram of a second exemplary embodiment of the brake system having the first pressure supply unit according to the first embodiment, FIG. 2 shows a circuit diagram of the first exemplary embodiment of the brake system having a first pressure supply unit according to a second embodiment, FIG. 3 shows a circuit diagram of the first exemplary embodiment of the brake system having a first pressure supply unit according to a third embodiment, FIG. 4 shows a circuit diagram of a third pressure supply unit (ESP unit), FIG. 5 shows a circuit diagram of the third pressure supply unit (ESP unit) while dissipating a pressure in a first error event in a 4-channel ABS control, FIG. 6 shows a circuit diagram of the third pressure supply unit (ESP unit) while building up a pressure in the first error event in a 4-channel ABS control, FIG. 7*a* shows a diagrammatic temporal profile of a "select high" control in a brake circuit having two wheel brakes, FIG. 7*b* shows a diagrammatic temporal profile of a "select low" control in a brake circuit having two wheel brakes, FIG. 8 shows a circuit diagram of a first exemplary embodiment of the brake system according to the invention having two isolation valves and one feed valve, FIG. 9 shows a circuit diagram of a second exemplary embodiment of the brake system according to the invention having four isolation valves and one feed valve, FIG. 10 shows a circuit diagram of the third pressure supply unit (ESP unit) while building up a pressure in the first error event in a yaw torque control, and FIG. 11 shows a circuit diagram of the third pressure supply unit (ESP unit) while dissipating a pressure in the first error event in a yaw torque control.

Components with equivalent functions are in some instances provided with the same reference signs in the figures.

The brake system 2 according to a first exemplary embodiment as illustrated in FIG. 1*a* has a first pressure supply unit 6 in a first embodiment. In this embodiment, the first pressure supply unit 6 has an electromotive drive 8 which acts on a piston of a piston/cylinder unit. Furthermore, the brake system 2 and in particular the first pressure supply unit 6 has a first control apparatus 9 which feeds in particular the electromotive drive 8 with control signals.

The first pressure supply installation 6 serves here to impinge a first brake circuit BK1 and a second brake circuit BK2 with a pressurizing medium. To this end, the cylinder of the first pressure supply unit 6 by way of a hydraulic line is hydraulically connected to the first brake circuit BK1 (cf. connection point A1) and to the second brake circuit BK2 (cf. connection point A2).

In the exemplary embodiment according to FIG. 1*a*, an isolation valve PD1 by way of which the first pressure supply unit 6 is able to be hydraulically reversibly isolated from the first brake circuit BK1 and from the second brake circuit BK2 is additionally disposed in this hydraulic line. The isolation valve PD1 here is configured as a solenoid valve.

Additionally, the first pressure supply unit 6 and in particular the cylinder of the first pressure supply unit 6 has a hydraulic connection line to a reservoir 40 in which a check valve is disposed. The hydraulic connection to the reservoir 40 serves for suctioning pressurizing medium from the reservoir 40.

Furthermore, the brake system 2 has a third pressure supply unit 90 which is only schematically illustrated in FIG. 1*a*. The third pressure supply unit 90 is also referred to as an ESP unit, or the ESP unit comprises the third supply unit 90, respectively. Moreover, a second control apparatus 95 which controls the third pressure supply unit 90 is provided.

A communications link 100, in particular a CAN bus link, is configured between the first control apparatus 9 and the second control apparatus 95. The communications link 100 serves for exchanging data and/or signals between the two control apparatuses 9, 95.

In particular, no valves are disposed in the hydraulic lines of the first brake circuit BK1 as well as of the second brake circuit BK2 in the exemplary embodiment according to FIG. 1*a*.

Moreover, a pressure transducer p/U which is disposed between the isolation valve PD1 and the first or the second brake circuit BK1, BK2, respectively, is provided in the hydraulic line. This pressure transducer p/U, in particular in an error event (cf. embodiments hereunder) serves for providing pressure information pertaining to the brake circuits BK1, BK2 in order for pressure to be adjusted in the brake circuits BK1, BK2.

As an alternative to the pressure transducer p/u, an item of information pertaining to the pressure adjusted by means of the first pressure supply unit 6 in this embodiment takes place by estimating the pressure by way of a motor rotary encoder a/U and/or the motor current i/u.

FIG. 1*b* shows a circuit diagram of a second exemplary embodiment of the brake system 2 having the first pressure supply unit 6 according to the first embodiment.

This exemplary embodiment corresponds substantially to the aforementioned exemplary embodiment of the brake system 2 according to FIG. 1*a*. A difference here lies in that an isolation valve BP1, TVBK2 is in each case disposed in the hydraulic line to the brake circuits BK1, BK2. An adjustment of a brake circuit-individual brake pressure by means of these two isolation valves BP1, TVBK2 is in particular possible in an error event.

A circuit diagram of the first exemplary embodiment of the brake system 2 having the first pressure supply unit 6 according to a second embodiment is illustrated in FIG. 2. This exemplary embodiment of the brake system 2 likewise corresponds substantially to the design embodiment of the brake system 2 according to FIG. 1*a*. However, the first pressure supply unit 6 in the exemplary embodiment according to FIG. 2 is configured as a rotary pump and in particular as a single-circuit piston pump, in particular a pump having 1 or a plurality of, in particular 3, pistons. The piston pump is embodied in a manner comparable to ESP pump drives in which the piston/pistons by way of an eccentric are driven by a shaft of an electric motor. In this design embodiment, a valve PD2 is additionally provided for enabling the pressure buildup or the pressure dissipation, respectively. When building up pressure, the PD2 valve can advantageously also be used for compensating pressure pulses of a pump driven by an eccentric. The pressure pulses are very high in particular in the case of a 1-piston pump.

The brake system 2 according to the first exemplary embodiment having a first pressure supply unit 6 according to a third embodiment, as is illustrated in FIG. 3, with the exception of the embodiment of the first pressure supply unit 6, likewise corresponds to the brake system 2 according to FIG. 1*a*. In the exemplary embodiment according to FIG. 3, the first pressure supply unit 6 is configured as a gear pump. Providing an item of information pertaining to the pressure provided by the pressure supply unit 6 in this exemplary embodiment, as an alternative to the pressure transducer p/u, takes place by estimating a pressure by way of a motor rotary encoder a/U and/or the motor current i/u. By virtue of the mechanical and functional design embodiment of the gear pump, no valve PD2 is required in this exemplary embodiment because pressure can also be dissipated by way of the gear pump by a reversal of the rotation direction, for example by embodying the drive motor of the gear pump as a brushless electric motor operated by way of a B6 bridge circuit and operating the electric motor in the 4-quadrant operation. Moreover, for reasons related to the operating principle, the pressure pulses are significantly weaker than in the case of an eccentric piston pump.

FIG. 4 shows a circuit diagram of a third pressure supply unit 90 (also referred to as an ESP unit) having the motor/pump unit 91 for use in the brake system 2 according to the invention. The ESP unit is known and has the main components pump P with motor M, the valves HSV1 and HSV2, USV1 and USV2, the inlet and outlet valves EV1 to EV4 and AV1 to AV4 assigned to the wheel brakes RB1, RB2, RB3, RB4, and one storage chamber (SpK) per brake circuit. This system is described in many publications and patent applications. Said system is already marketed as a 2-box brake system "e-booster+ESP" and is used above all in electric and hybrid vehicles. In this application, only the outlet valves of the ESP unit are actuated by way of the e-booster by way of a CAN interface in interaction with the brake torque of the generator, i.e. recuperation for the avoidance of a buildup of brake pressure in the wheel brakes, and the storage chamber SpK is used for receiving pressurizing medium.

One aspect of the invention lies in that the first control apparatus 9 by way of a communications link 100 is communicatively connected to the second control apparatus 95 ("ECU-ESP") of the ESP unit and, for achieving safety aspects, at least the inlet valves EV1 to EV4 are able to be controlled by the first control apparatus 9.

A (further) aspect of the invention lies in the wheel-individual pressure dissipation while using the outlet valves AV1 to AV4 and HSV valves of the ESP unit.

A circuit diagram of the third pressure supply unit 90 (ESP unit) while dissipating pressure in a first error event is illustrated by way of example in a brake circuit in FIG. 5. The first error event here can be understood to mean that a motor M of the third pressure supply unit 90 has failed. In this case, a pressure dissipation for the purpose of feedback control takes place by way of the first pressure supply unit 6. This takes place specifically in that the piston of the first pressure supply unit 6 is moved back (toward the right in the drawing plane, identified by an arrow) and opening of the outlet valves AV4 and AV3 as well as of the isolation valve HSV2 takes place, said outlet valves AV4 and AV3 in the normal state being closed when not energized. The valves which in this state are open for the volumetric flow, for highlighting the opened state, are in each case provided with an asterisk ("*") in FIG. 5 (left half of FIG. 5). The state of the other solenoid valves is not explicitly explained. In this way, at least the inlet valves EV1-EV4 are closed by active energizing when dissipating pressure, for example. The pressure dissipation from the wheel brakes RB3 and RB4 is in particular shown in an exemplary manner in FIG. 5 (the flow direction of the pressurizing medium from the wheel brakes to the first pressure supply unit 6 is identified by arrows). For this purpose, the pressure supply unit 90 can according to the invention be equipped with isolation valves HSV1, HSV2 which, as opposed to the typical use in ESP units, according to the invention are operated bidirectionally. The isolation valves HSV1 and HSV2 are also used for resupplying fluid from the reservoir 40 in a normal ESP operation with an active pump. By virtue of the given configuration, pressure from the wheel brakes RB1 and RB2, or RB3 and RB4, (not illustrated), respectively, can be selectively dissipated by opening and closing the isolation valves HSV1 and HSV2 when the isolation valves USV1 and USV2 are closed. A wheel-individual pressure adjustment can take place by correspondingly switching the outlet valves AV1 to AV4.

In the first error event, the actuation of the valves, in particular of the isolation valves USV1, USV2, HSV1, HSV2 and of the outlet valves AV1 to AV4 can also take place by the first control apparatus 9 and not, as in the normal case, by the second control apparatus 95. When controlling by the first control apparatus 9, the control signals required for this purpose here are transmitted to the third pressure supply unit 90 by means of the communications link 100. However, in the normal operation, in the absence of an error event, the second control apparatus 95 assumes the actuation of the valves. The normal operation here can be understood to mean a pressure buildup required for example for braking a vehicle in comparison to a pressure buildup for the purpose of feedback control (so as to prevent slipping or blocking of the wheel).

The inlet valves EV1 to EV4 are closed (by energizing) when dissipating pressure. A hydraulic connection to the first pressure supply unit 6 is configured by opening the isolation valve HSV2; an outflow of the pressurizing medium here is then facilitated by means of the first pressure supply unit 6 and not, as customary, by means of the pump P.

The pressure dissipation illustrated and explained by way of example for two wheel brakes RB3, RB4 in FIG. 5, in an analogous manner can alternatively also take place brake circuit-individually or wheel brake-individually. The wheel brake circuit-individual feedback control is used for the 4-channel ABS operation as well as for yaw torque interventions (also referred to as yaw torque feedback control(s)).

A pressure is preferably detected by means of the pressure transducer p/U in the ESP unit during this feedback control, so that information pertaining to the pressure for feedback-controlling the pressure dissipation is present at every point in time.

A pressure buildup in the first error event is illustrated by way of example by the circuit diagram of the third pressure supply unit 90 according to FIG. 6. In this case, the second control apparatus 95 controls the inlet valves EV1 to EV4 of the third pressure supply unit 90 as in the normal operation of the third pressure supply unit 90. The outlet valves AV1 to AV4 are (non-energized) closed when building up pressure. Additionally, the valve USV2 or USV1 is opened during the pressure buildup, while the valves HSV1, HSV2 remain (non-energized) closed. The pressure buildup in the two wheel brakes RB3, RB4 is shown by way of example in FIG. 6, so reference here is made in each case to the isolation valves HSV2 and USV2 situated within this brake circuit BK1. Alternatively, the pressure buildup illustrated and explained by way of example for two wheel brakes RB3, RB4 in FIG. 6, in an analogous manner can also take place brake circuit-individually or wheel brake-individually, as a result of which a wheel-individual pressure buildup and yaw torque intervention can take place.

The isolation valve PD1, if provided, which isolates the first pressure supply unit 6 from the brake circuits BK1, BK2 is operated so as to be open during the pressure buildup. The first pressure supply unit 6 by way of the hydraulic line conveys pressurizing medium into the wheel brakes RB3, RB4. Also in this exemplary embodiment, the pressure transducer p/U, which according to FIG. 6 is disposed in the second brake circuit BK2, is preferably utilized for detecting information pertaining to pressure. Alternatively, the controlling of the valves of the third pressure supply unit 90 in this exemplary embodiment can also be assumed by the first control apparatus 9 by way of the communications link 100.

A temporal profile of vehicle speed $V_F$, wheel circumferential speed $V_R$, reference speed $V_{REF}$, brake circuit pressure $P_h$ for "high wheel", $P_L$ for "low wheel" is in each case illustrated in FIGS. 7*a* and 7*b*. The slippage coefficient λ is the wheel speed at which a wheel becomes unstable, and is approximately equal to the reference speed $V_{RFE}$. In this way, the typical key indicators such as the λ-limit or (reference speed $V_{RFE}$), subpoint 1, 1', 2, 4 for the pressure dissipation $P_{ab}$ (slippage coefficient λ exceeded) and time points 3 and 5 for the pressure buildup $P_{auf}$ (slippage coefficient λ undershot) are illustrated in FIGS. 7*a* and 7*b*.

In homogenous conditions (all vehicle wheels are situated on asphalt, for example) switching takes place to a "select-low" feedback control (FIG. 7*b*), i.e. a corresponding pressure which is so low that no wheel is blocked is adjusted. In this way, approx. 20% of the full braking action is dispensed with.

In non-homogenous conditions, for example p-split, i.e. wheels on a vehicle side on ice, the other vehicle side on a wet or dry road, the "select-high" feedback control (FIG. 7*a*) sets in, i.e. the wheels that are not blocked are feedback-controlled, while the wheels with the low coefficient of friction remain blocked. Here too, approx. 20% of the optimum braking action is dispensed with.

As has already been explained, FIG. 7*a* shows a "select-high" feedback control. The description of the ABS feedback control assumes the general principles that are known from patent applications, brake manuals and brochures. As a result of the tire slippage characteristic, a slippage between the vehicle speed $V_F$ and the wheel circumferential speed $V_R$=wheel slippage is thus formed as a brake pressure increases. In the case of a slippage coefficient λ that is a function of many factors, the maximum of the tire circumferential force is exceeded, the latter in the absence of feedback control leading to the wheel blocking. By way of the feedback-controller which evaluates the wheel acceleration (positive and negative) and the slippage λ, the pressure feedback control with the pressure dissipation $P_{ab}$ and the pressure buildup $P_{auf}$ becomes effective with a view to the desired, optimum brake force and cornering force. A reference speed=λ-limit, which corresponds to the optimum slippage λ, is likewise formed by the feedback-controller using complex algorithms.

In this way, FIG. 7*a* specifically shows an exemplary temporal profile of a "select-high" feedback control in a brake circuit having two wheel brakes. At the time point 1, as a result of the pressure buildup $P_{auf}$ by the first pressure supply unit 6, the blocking limit at the wheel $V_{R1}$ (at a low coefficient of friction low-p) is reached at the pressure $p_1$, this wheel as a consequence in the case of a further pressure buildup $P_{auf}$ reaching a wheel circumferential speed $V_R$=0 and thus blocking. Consequently, the pressure continues to be built up. A further pressure buildup $P_{auf}$ has the effect that the wheel $V_{R2}$ at the time point 2, shortly upon exceeding the λ-limit at the pressure level $p_2$, likewise becomes unstable and the wheel circumferential speed $V_{R2}$ decreases sharply. Consequently, the pressure is reduced by the pressure supply, for example by restoring the piston. The pressure differential ΔP of the previously determined pressures $p_1$ and $p_2$ is evaluated. If the pressure differential $\Delta P=P_2-P_1$ is significant, i.e. pressure $p_2$ exceeds pressure $p_1$ by more than 30%, the "select-high" feedback control (also referred to as selective "high-p" control) is initiated. The pressure is then moderately reduced by $\Delta p_{ab}$=20% in both brake circuits, i.e. the circuit isolation valves (BP1/BP2, TVBK2; cf. FIG. 9) are not utilized for a selective pressure dissipation and are in the opened state.

As a consequence, the wheel $V_{R2}$ does not block at the time point 3 and again undershoots the λ-slippage limit at the time point 3. A pressure buildup in stages follows from the time point 3. In a first stage, the pressure is increased by 70% of the previous $\Delta p_{ab}$ value, for example, and in a second step increased by a further 30%, so that the pressure $p_2$ is reached again and subsequently exceeded. In this phase, the pressure transducer p/U is preferably used for pressure measurement. The slippage limit is again exceeded at the time point 4. Thereafter, the pressure is reduced again, as at the time point 2, and subsequently increased again in stages so that the wheel undershoots the slippage limit again at the time point 5. This feedback control method is continued during the feedback controlling.

FIG. 7*b* specifically shows an exemplary temporal profile of a "select-low" feedback control in a brake circuit having two wheel brakes. Here, the pressure differential $\Delta P=P_2-P_1$ is relatively minor in the range between 10% and 20%. As a consequence, the wheels with minor pressure differentials become unstable. This is an indication for an operation on a homogenous carriageway. As described previously in the context of the "select-high" feedback control, the pressure is reduced by $\Delta p_{ab}$ and increased again in stages. As opposed to the "select-high" feedback control, the pressure in the case of the "select-low" feedback control is however dissipated more intensely, for example $\Delta p_{ab}$=40%, so that the low wheel is relieved from the blocked state at the time point 6, i.e. as opposed to the "select-high" feedback control, no wheel is operated in the blocked state. The pressure is kept low until first the wheel $V_{R2}$ and then the wheel $V_{R1}$ undershoots the λ-limit at the time point 3; then only is the pressure increased again in stages. The slippage limit of the wheel $V_{R1}$ is exceeded again at the time point 4, and the pressure is lowered again and subsequently increased in stages.

FIGS. 7*a* and 7*b* show only the general aspects of the "select-low"/"select-high" feedback control. Many enhancements are conceivable, such as another test in a "select-high" feedback control, when the pressure level is reduced in the "high" wheel. Alternatively, the "select-low" wheel can also exit the blocked state again without feedback control and exceed the λ limit. This potential wheel speed profile is identified by X in FIG. 7*a*. Thereafter, another "select-low"/"select-high" test can take place, optionally with switching over from a "select-high" feedback control to a "select-low" feedback control.

As has already been explained, in one exemplary embodiment, in the second error event switching from a "select-low" feedback control to a "select-high" feedback control takes place by way of the first control apparatus 9 when the first control apparatus 9 detects that the vehicle is situated on a non-homogenous hard ground, for example a partially icy road. For this purpose, it is necessary that the brake system 2 according to the invention by means of the first pressure supply unit 6 can adjust different pressures in the individual brake circuits BK1, BK2. The design embodiments already shown schematically by means of FIGS. 1*b*, 8 and 9 are particularly suitable for this purpose. In order for this control strategy to be implemented, the control apparatus 9 monitors the pressures in the individual wheel brakes RB1, RB2, RB3, RB4 that lead to a blocking of the wheels. If these pressures between two wheels, in particular within one brake circuit BK1, BK2, deviates by more than 30% from one another, switching by the first control apparatus 9 takes place from a "select-low" feedback control to a "select-high" feedback control, so as to still achieve a very positive braking result even within said error event.

FIG. 8 shows a circuit diagram of a brake system 2 which comprises a first module (referred to as X-boost) and a second module. The first module—the X-boost—has a first pressure supply unit 6 having an electromotive drive 8, as well as a second pressure supply unit 14 having a master brake cylinder 22 and an activation element 26 having a brake pedal. Furthermore provided is a valve installation having various solenoid and check valves.

The second module and in particular the third pressure supply unit 90 comprises an electrically driven motor/pump unit 91 having a pump with an electromotive drive. The third pressure supply unit 90 can be any arbitrary ESP unit. A suitable ESP unit is described in detail in DE 10 2014 205 645 A1. Alternatively, a standard ABS unit without ESP function can be used as the second module.

The two modules (X-boost and ESP unit) are specified for impinging two brake circuits BK1 and BK2 with pressurizing medium, wherein the modules are preferably hydraulically connected in series. In one exemplary embodiment, the X-boost is fastened to the scuttle of a vehicle, the second module (ESP unit) at two hydraulic interfaces or connection points A1, A2 (cf. solid black points in FIG. 8 relating to BK1, BK2), respectively, being connected thereto by way of hydraulic lines.

The first pressure supply unit 6 by way of a first hydraulic line HL1 is connected to the first brake circuit BK1, or to the corresponding interface, respectively. Furthermore provided is a second hydraulic line HL2 for connecting the first pressure supply unit to the second brake circuit, or to the corresponding interface, respectively.

According to the invention, the second pressure supply unit 14 of the X-boost only has one master brake cylinder 22 having a piston 24 and a piston chamber. In the exemplary embodiment, the second pressure supply unit 14 is embodied with a single circuit and by way of a third hydraulic line HL3 and a feed valve 69 is connected to the brake circuit BK1, or to the corresponding hydraulic interface, respectively. A fluidic connection to the second hydraulic line HL2 runs by way of an optional first isolation valve BP1 (highlighted by a border with dashed lines). The second pressure supply unit 14 by closing the feed valve 69 is able to be isolated from the brake circuits BK1, BK2 in such a manner that the activation element 26 in the normal brake-by-wire operation without errors (for example without a brake circuit failure) acts only on a travel simulator 28.

In the exemplary embodiment as per FIG. 8, the brake circuits BK1 and BK2 are able to be isolated by way of the optional first isolation valve BP1 (preferably open when not energized), if present. According to the invention, in the event of a failure of the first pressure supply unit 6, the master brake cylinder 22 of the second pressure supply unit 14 by opening the first isolation valve BP1 can in this way be connected either only to the first brake circuit BK1 or to the first and the second brake circuit BK1, BK2. For this emergency operation, the feed valve 69 is configured as a valve that is open when not energized. To the extent that a current is still applied, said feed valve 69 is open so that the second pressure supply unit 14 is no longer hydraulically decoupled from the brake circuits BK1, BK2.

The first pressure supply unit 6 likewise selectively acts on the second brake circuit BK2 (first isolation valve BP1 closed) or both brake circuits BK1, BK2 (first isolation valve BP1 opened or open when not energized). The first isolation valve BP1 is open in the normal operation so that the first pressure supply unit 6 supplies both brake circuits BK1, BK2 with pressure, and the second pressure supply unit 14 by the closed feed valve 69 is decoupled from the first brake circuit BK1. If it is established that volume is lost from the brake circuits BK1, BK2, the brake circuit BK1 by means of the first isolation valve BP1 can be decoupled from the first pressure supply unit 6 so that, in the event of a leakage in the first brake circuit BK1, the second brake circuit BK2 can continue to be operated without hydraulic fluid losses.

In the exemplary embodiment, the isolation valve BP1 is embodied as a solenoid valve, wherein the ball seat of the isolation valve BP1 by way of a connector (valve seat connector) is connected to the portion of the hydraulic line that leads to the first pressure supply unit 6. In this way, the isolation valve BP1 can also be reliably closed by energizing in the event of a failure of the first brake circuit BK1, and is not forced open by higher pressures in the operation of the first pressure supply unit 6.

The second pressure supply unit 14 upon activation of the activation element 26 feeds the travel simulator 28 by way of a breather bore in a wall of the master brake cylinder 22, such that a progressive haptic resistance in the form of a restoring force as a function of a variable of the activation of the activation element 26 can be felt.

The variable of the activation here can be understood to mean how "firmly and/or how far" a driver activates the activation element 26 configured as a brake pedal, and thus pushes the piston 24 into the master brake cylinder 22. The progressive haptic resistance is also referred to as a pedal characteristic.

A travel simulator valve 29 can be provided for blocking the connection to the travel simulator 28.

The second pressure supply unit 14 has at least one breather bore 38 which by way of hydraulic lines is connected to a reservoir 40. The reservoir 40 is likewise part of the brake system 2.

In the exemplary embodiment, a check valve RVHZ as well as a throttle DR can be disposed in the hydraulic line between the breather bore 38 and the reservoir 40. By means of this check valve RVHZ and the first pressure supply unit 6 it is possible to carry out a diagnosis pertaining to a state of preservation of sealing elements disposed within the first pressure supply unit 6 as well as within the travel simulator 28. The travel simulator valve 29, if present, can be closed when checking the seal of the master brake cylinder 22.

As illustrated, the master brake cylinder 22 has two sealing elements 42*a*, 42*b*, which are configured as annular seals. The breather bore 38 is disposed between the two sealing elements 42*a*, 42*b*. A throttle DR is disposed in the connection between the breather bore 38, which is disposed between the two sealing elements 42*a*, 42*b*, and the reservoir 40.

The throttle DR in terms of the flow rate thereof is sized such that the pedal characteristic is not substantially changed (3 mm pedal travel in 10 s) in the event of a failure of the sealing element 42*a*. Moreover, a temperature-related volumetric compensation of the pressurizing medium can take place by way of the throttle DR.

High pressure peaks in the brake circuits BK1 and BK2, which can significantly stress the first pressure supply unit 6, can be created in an ABS operation of the third pressure supply unit 90. In the variant of design embodiment according to FIG. 8, a pressure limitation valve ÜV is connected to the piston chamber of the first pressure supply unit 6 by way of a bore, so that the high pressure peaks are dissipated and damage to the system is avoided.

A suction valve NV is likewise fluidically connected to the piston chamber of the first pressure supply unit 6 and enables pressurizing medium to be resupplied from the reservoir 40. In this way, the first pressure supply unit 6 can independently introduce additional pressurizing media into the brake circuits BK1, BK2. An additional breather bore provided in the cylinder of the first pressure supply unit 6 enables a volumetric compensation in the initial position of the piston of the first pressure supply unit 6.

The third pressure supply unit 90 is only schematically illustrated in FIG. 8. Said pressure supply unit 90 ultimately supplies four wheel brakes RB1, RB2, RB3 and RB4. In the schematic illustration, the wheel brakes RB1, RB2 operate a front axle VA of the vehicle, and the wheel brakes RB3 and RB4 operate a rear axle HA of the vehicle. An electric drive motor for driving the vehicle is situated on the rear axle HA of the vehicle. The vehicle can be a purely electric vehicle or a hybrid vehicle.

The first brake circuit BK1 is connected to the wheel brakes RB1 and RB2, and the second brake circuit BK2 is connected to the wheel brakes RB3 and RB4. A corresponding allocation is advantageous for the hydraulic assembly illustrated in FIG. 8.

The third pressure supply unit 90 furthermore possesses a control apparatus 95 ("ECU-ESP").

The second pressure supply unit 14 likewise possesses a printed circuit board which has a level sensor NST which detects the position of a magnetic float gauge NS within the reservoir 40. The PCB furthermore has sensors 30*a*, 30*b* for detecting the pedal travel as well as a difference in the distance of travel between the piston 24 and the pedal travel.

A suction valve 70*b*, which connects the pump of the third pressure supply unit 90 to the reservoir 40, is provided in the first brake circuit BK1 for providing additional pressurizing medium for the third pressure supply unit 90.

When the pump of the third pressure supply unit 90 requires pressurizing medium for the second brake circuit BK2, the latter can thus be provided from the reservoir 40 by way of the suction valve 70*c*.

In this way, for suctioning pressurizing medium, the two brake circuits BK1, BK2 by the respective hydraulic lines HL1, HL2 are in each case connected to the reservoir 40 by way of one suction valve 70*b* or 70*c*, respectively. In order to achieve optimum suctioning of the pressurizing medium, the suction valve 70*c* preferably has a diameter in the range from 30 mm to 50 mm and in particular a diameter of 40 mm.

The exemplary embodiment optionally possesses a control of the clearance between the brake pads and the disk brake. The wheel brakes RB1, RB2, RB3, RB4 (cf. FIG. 8) can be configured as frictionless wheel brakes RB1, RB2, RB3, RB4. In a brake-by-wire system, disk brakes having brake pads which are spaced apart by way of a clearance in the absence of pressure in the brake system enable the frictional resistance to be reduced. This can be achieved by the use of rollback seals, restoring springs of the brake pads, or by actively retracting the brake pads by generating a vacuum by means of the pressure supply 6, as is explained in EP 2 225 133 by the applicant.

The clearance in the wheel brake RB1, RB2, RB3, RB4, which is variable during operation, can be measured in a wheel-individual or brake circuit-individual manner by evaluating the pressure profile by means of the first pressure supply unit 6. According to the invention, corresponding measuring can take place when servicing, or else during the operation of the vehicle. The measurement is preferably performed in a stationary vehicle or after braking.

Using the known clearance values of the wheel brakes RB1, RB2, RB3, RB4, the clearance when activating the wheel brake RB1, RB2, RB3, RB4 is first rapidly overcome by means of a piston travel control of the first pressure supply unit 6. In this respect, the use of a brushless motor as an electromotive drive 8 of the first pressure supply unit 6 with a small time constant is to be preferred, because the action of overcoming the clearance can be implemented without the driver perceiving the latter when activating the brake.

Moreover, the brake system 2 can be controlled so that the vehicle electric motor is active in the phase of the clearance. In this way, a braking action is generated immediately when activating the brake.

In one exemplary embodiment of the invention, differences in the clearances of the wheel brakes RB1, RB2, RB3, RB4 are compensated for in that the inlet valves EV1 to EV4 of the second module (ESP unit) are actuated, and/or the electric motor of one or a plurality of vehicle axles is utilized for generating a braking action at the beginning of braking. By way of the clearance, stick-slip effects of new brake systems at low speeds can generally be reduced or avoided.

In one exemplary embodiment, the brake system 2 according to the invention in the event of a failure (error event 4) of the ESP unit implements a very simple variant of an intermittent brake. Locking of the wheels is avoided and the steerability is maintained by moving the piston of the first pressure supply unit 6 in a reciprocating manner between an upper and lower pressure range. As opposed to a 1-channel ABS operation, no measurement values, for example pressure and wheel speeds, are required in this form of deceleration.

The automated intermittent brake leads to sufficient stopping distances (approx. 200% of the stopping distance in the ABS mode in comparison to a full-fledged wheel-individual ABS) and to acceptable stability by maintaining the steerability.

The brake system according to the invention can provide the decisive advantage that the brake pedal acts only on the piston 24 and by way of the feed valve 69 is isolated from the brake circuits BK1, BK2. In this way, the function of the automated intermittent brake with the X-boost or X-booster, respectively, cannot be interfered with by the driver as opposed to the prior art (WO2011/098178).

Alternatively to the intermittent brake, a 1-channel ABS operation with "select-low" feedback control (error event 3) can be implemented. This leads to a further deterioration of the stopping distance (approx. 400% stopping distance in comparison to the stopping distance with a full-fledged wheel-individual ABS) but to an unrestricted vehicle stability and in terms of this characteristic is superior to the intermittent brake. In this form of the 1-channel ABS operation, measurement values such as, for example, pressure and wheel speeds are required, which can be imported from the ESP unit by way of a communications link/interface, for example a CAN interface.

In order to further increase the availability of the brake system 2 according to the invention according to FIG. 8, the electromotive drive 8 of the first pressure supply unit 6 is connected to the control unit 9 (ECU-DV) of the X-boost by way of two redundant three-phase strands, and the electronic system is embodied so as to be (partially) redundant. For example, two B6 bridges can be provided for each strand. Moreover, in at least one exemplary embodiment, the electronic system is connected to two redundant voltage supplies. In this way, the failure probability of the electromotive drive 8 can be reduced by the factor of 4-10, and the error event (failure of the first pressure supply unit 6) can be further significantly reduced.

The control apparatus 95 of the ESP unit 90, as well as the control unit 9 (ECU-DV) of the X-boost, are connected to one another by way of the communications link 100, for example a CAN bus. To this extent, it is possible for control commands to be released to the third pressure supply unit 90, said control commands causing an activation of the drive 91 and/or of the provided valves (cf. also FIG. 8).

The following safety-relevant redundancies can be implemented using the brake system 2 as per FIG. 8:

- ensuring a sufficient braking action for meeting the statutory requirements in the event of a brake circuit failure, failure a) of the second pressure supply unit 14, b) of the first pressure supply unit 6, or c) of the first pressure supply unit 6 and the third pressure supply unit 90 (simultaneously), i.e. also meeting statutory requirements in the case of double errors:
  - error event 1—failure of the third pressure supply unit 90: deceleration by boosting the brake force by way of the first pressure supply unit 6 in both brake circuits BK1, BK2;
  - error event 2—failure of the third pressure supply unit 90 and of the brake circuit BK1: deceleration by boosting the brake force by way of the first pressure supply unit 6, for example on the rear axle;
  - error event 3—failure of the third pressure supply unit 90 and of the second brake circuit BK2: deceleration by the second pressure supply unit 14, for example on the front axle (first isolation valve BP1 closed)
  - error event 4—failure of the first pressure supply unit 6: deceleration by boosting the brake force by way of the third pressure supply unit 90;
  - error event 5—failure of the first pressure supply unit 6 and of the first brake circuit BK1 or of the second brake circuit BK2: deceleration by boosting the brake force by way of the third pressure supply unit 90 in one of the brake circuits BK1, BK2, optionally facilitated by the vehicle electric motor on one axle;
  - error event 6—failure of the first pressure supply unit 6 and of the third pressure supply unit 90: braking by the master brake cylinder on the front axle VA and optionally by the electric drive motor on the rear axle HA;
  - error event 7—failure of the on-board network: braking by the second pressure supply unit 14 optionally on the front axle VA and the rear axle HA;
- electronic brake force distribution (EBV) in the event of failure of the ESP unit by generating pressure in the first brake circuit BK1 by way of the third pressure supply unit 90, and generating pressure in the second brake circuit BK2 by way of the first pressure supply unit 6, with the first isolation valve BP1 closed, and controlling the first pressure supply unit 6 by way of a sensor assembly of the second pressure supply unit 14. Required to this end is a S/W brake circuit split, i.e. the wheels of the front axle VA are connected to the first brake circuit BK1, and the wheels of the rear axle HA are connected to the second brake circuit BK2;
- controlling the clearance between the brake pads and the disk brake;
- 4-channel ABS operation and/or yaw torque feedback-control when actuating the valves of the ESP unit;
- 1-channel ABS operation or implementation of an automated intermittent brake.

FIG. 9 shows an alternative design embodiment of the X-boost according to FIG. 8. As opposed to the exemplary embodiment according to FIG. 8, a second isolation valve TVBK2 is disposed in the second hydraulic line HL2 in FIG. 9. This second isolation valve TVBK2 enables the second brake circuit BK2 to be hydraulically decoupled from the first pressure supply unit 6. In this way, the first pressure supply unit 6 can selectively provide pressurizing medium in the first brake circuit BK1 or in the second brake circuit BK2 or in both brake circuits. When volumetric loss is detected in the second brake circuit BK2, the latter can be decoupled.

Furthermore, the exemplary embodiment according to FIG. 9 differs in that a third isolation valve BP2 is provided in the first hydraulic line HL1 between the first isolation valve BP1 and the first connection point A1 for the first brake circuit BK1. This third isolation valve BP2 is preferably disposed such that the third hydraulic line, in a hydraulic connection between the first isolation valve BP1 and the third isolation valve BP2, opens into the first hydraulic line HL1. The third isolation valve BP2 enables the first brake circuit BK1 to be hydraulically decoupled from the first pressure supply unit 6 as well as from the second pressure supply unit 14. In the case of a failed first pressure supply unit 6, it is thus possible for pressurizing medium, proceeding from the second pressure supply unit 14, to be introduced into the second brake circuit BK2 by way of the feed valve 69, the first isolation valve BP1 and the second isolation valve TVBK2. No pressurizing medium is dispensed into the first brake circuit BK1 when the third isolation valve BP2 is closed.

The following safety-relevant redundancies can be implemented using the brake system 2 as per FIG. 9:

- ensuring a sufficient braking action in the event of a failure of the one or the plurality of pressure supply units,
  - error events 1-7: see embodiment 1;
  - error event 8—failure of the feed valve 69 (for example leaky), or failure of the electric actuation: closure of the third hydraulic line HL3 by the isolation valves BP1 and BP2 so that the travel simulator 28 is fully effective; the first pressure supply unit 6 adjusts wheel pressures in the brake circuit BK2 and/or the ESP unit adjusts wheel pressures in both brake circuits BK1 and BK2,
  - further degree of freedom: selectively feeding the pressure of the master brake cylinder into the brake circuit BK1 or BK2 in the event of a failure of a brake circuit;
- ensuring a 4-channel ABS feedback control and/or a yaw torque feedback control when actuating the valves of the ESP unit,
- 2-channel ABS operation according to the select-low and select-high method, or 1-channel ABS according to the select-low method with wheel rotational speed sensors;
- Electronic brake force distribution (EBV) in the event of a failure of the ESP unit by generating pressure in the brake circuit BK1 by way of the second pressure supply unit 14, and generating pressure in the brake circuit BK2 by way of the first pressure supply unit 6, with a closed first isolation valve BP1, and controlling the pressure supply by way of the sensor assembly of the second pressure supply unit 14. Required to this end is the S/W brake circuit distribution, and the brake force distribution into the brake circuits is controlled by way of the isolation valves BP1, BP2 and TVBK2. According to the invention, the piston of the first pressure supply unit 6 for applying a suitable pressure can be controlled in a reciprocating stroke movement. Optionally, an adjustment of pressure can take place by way of a PWM control of the valves, in particular of the isolation valves;
- The clearance control is already embodied in the exemplary embodiment as per FIG. 8. The exemplary embodiment as per FIG. 9 offers the additional potential of compensating for the unequal clearance in the wheel brakes RB1, RB2, RB3, RB4 of the brake circuits BK1, BK2 by a corresponding pilot control prior to the brake force boosting operation by sequentially opening the isolating valves BP1, TVBK2. Alternatively, the PWM operation may also be used so that different flow cross sections to the brake circuits BK1, BK2 are established and the unequal clearance can simultaneously be compensated for. A S/W brake circuit split is suitable here. This method is readily possible because the brake circuit isolation valves are a component part of the X-boost module and can be implemented without any temporal delay and susceptibility to faults (utilizing an interface between the X-boost and the ESP unit, for example). In this way, the brake system can be designed in such a manner, for example, that no clearance is provided on the brake pads on the front axle, and a clearance is provided on the rear axle. In this way, a failure of the first pressure supply unit 6 does not lead either to a temporal delay in braking when pressure is generated by the activation unit and acts according to the invention on the wheel brakes RB1, RB2, RB3, RB4 of the front axle VA. Moreover, a greater braking action can be generated by the front axle VA.

A circuit diagram of the third pressure supply unit (ESP unit) while dissipating pressure (cf. FIG. 11) or building up pressure (cf. FIG. 11) in the first error event during yaw torque feedback control is in each case shown in FIGS. 10 and 11. In principle, the feedback control here is performed in a manner similar to the 4-channel ABS likewise possible in the first error event. In the case of the yaw torque feedback control, however, the pressure dissipation as well as the pressure buildup—as opposed to the 4-channel ABS feedback control—takes place by way of the inlet valves EV1-EV4 as well as the USV valves. Opened valves relevant for the flow are in each case provided with an asterisk (*) in FIG. 10 as well as FIG. 11. The state of the other solenoid valves is not explicitly explained. For example, at least the inlet valves EV2, EV3, EV4 are thus closed by active energizing during pressure dissipation. To the extent that the valves are valves actuatable by means of a PWM signal, open in the context of this application can also be understood to mean that these valves are actuated by actuation with a PWM signal, such that a predefined opening cross section is established thereby. In this way, a flow rate through the respective valve is able to be controlled by actuating the valves by means of a PWM signal. Specifically, the inlet valves EV1-EV4 and the valves USV1, USV2 in FIGS. 10 and 11 are actuatable by means of a PWM signal. In this way, a flow rate through these valves in the situations described hereunder is able to be feedback-controlled or controlled, respectively.

A wheel-selective yaw torque feedback control during a pressure buildup in the wheel brake RB4 is shown in an exemplary manner in FIG. 10. To this end, the inlet valve EV1 assigned to the respective wheel brake, here the wheel brake RB4, and the isolation valve USV2 assigned to the respective brake circuit, here the first brake circuit BK1, are passed through by a flow of pressurizing medium. The valves in this embodiment do not have to be actively actuated because said valves are passively open in the non-energized open state and bidirectionally permit a volumetric flow of the pressurizing medium. For the selective pressure generation in a wheel brake RB4, the other inlet valves EV1-EV3, by way of which pressure is not to be built up (RB1-RB3) are actuated in such a manner that the solenoid valves are moved from the open state to the energized closed state. In this context, actuating in the case of a valve that is open when not energized can be understood to mean that the inlet valves EV1-EV3 are closed, i.e. switched so as not to conduct pressurizing medium.

Likewise, the HSV valves for the selective pressure generation in the wheel brake RB4 are closed, i.e. switched so as not to conduct pressurizing medium.

In this way, an impingement of pressure from the first pressure supply unit 6 by way of the isolation valve USV2 and the inlet valve EV4 takes place exclusively to the wheel brake RB4 (schematically indicated by an arrow). In addition to a wheel brake RB1, RB2, RB3, RB4, a yaw torque can be generated in a plurality of wheel brakes RB1, RB2, RB3, RB4. To this end, those inlet valves EV1-EV4 in the wheel brakes RB1, RB2, RB3, RB4 are closed in each case by way of which a pressure is not to be built up. By way of this enhancement, a yaw torque can be simultaneously generated in, for example, 2 wheel brakes RB1, RB2, RB3, RB4 of one vehicle side. Since brake circuits are typically embodied so as to be black and white, or diagonal, in this instance consequently one wheel brake RB1, RB2, RB3, RB4 of one brake circuit is in each case impinged with pressure. A further potential enhancement of the yaw torque feedback control is possible as a result of a sequential or simultaneous multiplex operation of the circuit isolation valves BP1/BP2 and TVBK2 of the first module (embodiment according to FIG. 9). In this way, a pressure in a wheel brake RB1, RB2, RB3, RB4 (for example RB4 of the right rear wheel) can be brought to a pressure level, wherein the circuit isolation valve TVBK2 upon reaching the pressure valve is closed in order to maintain the pressure.

Moreover, another pressure level can be adjusted in a wheel brake RB1, RB2, RB3, RB4 of the other brake circuit (for example RB2 of the right front wheel), wherein the second brake circuit isolation valve BP1 or alternatively BP2 is closed in order to maintain the pressure. The brake circuit isolation valves BP1/BP2 and TVBK2 are required for maintaining pressure because the inlet valves of the wheel brakes RB1, RB2, RB3, RB4 have check valves connected in parallel. In this way, maintaining pressure in the second module (ESP unit) is impossible when the pressure has dissipated, or when a lower pressure level is adjusted in the second brake circuit.

The following states thus result for the relevant valves of the third pressure supply unit 90 for the pressure buildup according to FIG. 10:

HSV1: closed (not energized)
HSV2: closed (not energized)
EV4: open (open when not energized, or energized by the PWM method, i.e. partially opened)
EV1-EV3: closed (energized)
All other valves in the hydraulic, in particular non-energized, initial state In the case of pressure dissipation, as shown in FIG. 11, for example, the return of pressurizing medium takes place in an analogous but reversed manner from the wheel brake RB4 by way of the inlet valve EV4 and the isolation valve USV2 to the first pressure supply unit 6. In an analogous manner, the pressure dissipation then also takes place in the event of yaw torque interventions in a plurality of wheel brakes. Here too, the multiplex method is preferably used.

In one embodiment, a plurality of, in particular all four, wheel brakes RB1, RB2, RB3, RB4 can additionally be actuated individually and wheel-selectively in an analogous manner, and a wheel-selective yaw torque feedback control can thus be implemented. Alternatively or additionally, the yaw torque feedback control in one embodiment can take place in a brake circuit-selective manner, so that two wheel brakes of one brake circuit are in each case conjointly actuated.

Specifically, the following states are thus derived for the relevant valves of the third pressure supply unit 90 for the pressure dissipation according to FIG. 11:

HSV1: closed (non-energized)
HSV2: closed (non-energized)
EV4: open (open when non-energized or energized by the PWM method, i.e. partially opened)
USV1: closed (closed when energized)
EV1-EV3: closed (energized)
All other valves in the hydraulic, in particular non-energized, initial state At this point it is to be pointed out that all parts described above are in each case to be considered individually—even without features which have been additionally described in the respective context, even when said features have not been explicitly identified individually as optional features in the respective context, for example by using: in particular, preferably, for example, e.g., optionally, parentheses, etc.—and in combination or any arbitrary sub-combination as independent design embodiments or refinements of the invention, respectively, as defined in particular in the introduction to the specification and the claims. Deviations therefrom are possible. Specifically, it is to be pointed out that the word "in particular" or parentheses do not identify features which are mandatory in the respective context.

LIST OF REFERENCE SIGNS

2 Brake system
6 First pressure supply unit
8 Electromotive drive
9 Control apparatus (ECU-DV)
14 Second pressure supply unit
22 Master brake cylinder
24 Piston
26 Activation element
28, WS Travel simulator
28*a*, 28*b* Sealing element of the travel simulator
29 Travel simulator valve
30*a*, 30*b* Pedal travel sensor
38 Breather bore of the second pressure supply unit
40 Reservoir
42*a*, 42*b* Sealing element of the auxiliary piston
69 Feed valve
70*b*, 70*c*, 80*d*, Suction valve (check valve)
RV1, RV2, NV Suction valve (check valve)
RVHZ Check valve (master cylinder)
74, PD1, PD2 Isolation valve
80, UV Pressure limitation valve
90 Third pressure supply unit
91 Motor/pump unit
95 Control apparatus of the ESP unit
100 Communications link (CAN bus)
A1, A2 Connection point
B1, B2 Electrical connections (three-phase)
P Pump
M Motor
BP1, TV1 First isolation valve
TVBK2, TV2 Second isolation valve
BP2 Third isolation valve
RB1, RB2, RB3, RB4 Wheel brake
DR Throttle
BK1 First brake circuit
BK2 Second brake circuit
HL1 First hydraulic line
HL2 Second hydraulic line
HL3 Third hydraulic line
HL4 Fourth hydraulic line
VA Front axle
HA Rear axle
NS Float gauge NST Level sensor
HSV1, HSV2, Isolation valves of the ESP unit
USV1, USV2 Isolation valves of the ESP unit
AV1, AV2, AV3, AV4 Outlet valve of the ESP unit
EV1, EV2, EV3, EV4 Inlet valve of the ESP unit
What is claimed is:

1. A brake system including:

a first module, comprising a first pressure supply unit having an electromotive drive and a first control apparatus for controlling the first pressure supply unit, wherein the first module is configured to apply a pressurizing medium to at least one first brake circuit by way of a first connection point, and at least one second brake circuit by way of a second connection point, wherein the brake circuits are assigned wheel brakes, a second module, comprising a second pressure supply unit, in the form of a motor/pump unit, isolation valves as well as brake pressure adjustment valves, comprising outlet valves and inlet valves, configured to adjust pressures in the wheel brakes, and a second control apparatus for controlling the brake pressure adjustment valves, a detection unit configured to detect a first event, wherein, to provide an anti-lock braking system (ABS) function during the first event, the brake system is configured to implement a wheel-individual and/or selective adjustment of the pressures in the wheel brakes while actuating at least one of the brake pressure adjustment valves of the second module, wherein the first pressure supply unit is controlled such that the first pressure supply unit, when releasing pressure from the wheel brakes via respective ones of the outlet valves associated with respective ones of the wheel brakes by opening the outlet valves to provide the ABS function, generates a pressure sink having a lower pressure than the pressures in the wheel brakes.

2. The brake system as claimed in claim 1, wherein the brake system in the first event, for dissipating pressure in one of the wheel brakes, is configured for opening the respective outlet valve associated with the one of the wheel brakes.

3. The brake system as claimed in claim 1, wherein a communications link, in the form of a bus link, is configured between the first control apparatus and the second control apparatus, wherein the first control apparatus is configured for receiving pressure measurement values of the second pressure supply unit and/or wheel rotational speed signals by way of the communications link.

4. The brake system as claimed in claim 1, wherein a communications link in the form of a bus link, is configured between the first control apparatus and the second control apparatus, wherein the first control apparatus and the second control apparatus are configured for receiving pressure measurement values of the second pressure supply unit and/or wheel rotational speed signals by way of the communications link.

5. The brake system as claimed claim 4, wherein the first control apparatus or the second control apparatus or a third control apparatus in the first event are configured for controlling the first pressure supply unit and the brake pressure adjustment valves so as to implement a wheel-individual and/or brake circuit-individual pressure feedback control in the wheel brakes or the brake circuits.

6. The brake system as claimed in claim 1, wherein a first isolation valve of the first module is disposed in a first hydraulic line between the first pressure supply unit and the first connection point, and a second isolation valve is disposed in a second hydraulic line between the first pressure supply unit and the second connection point, wherein the brake system is configured to detect a second event corresponding to a total failure of the second module, in the second event to control the first pressure supply unit and the first and the second isolation valve so as to implement at least a brake circuit-individual pressure feedback control in the at least two brake circuits.

7. The brake system as claimed in claim 6, wherein the brake system is configured to detect a non-homogenous road condition corresponding to a u-split situation, and in the second event and in the non-homogenous road condition to control the first pressure supply unit so as to adjust in at least one selected brake circuit of the brake circuits a target brake pressure which is determined as a function of a wheel blocking pressure of that wheel brake of the selected brake circuit that has the coefficient of friction that is higher in comparison to the other wheel brake-of the selected brake circuit.

8. The brake system as claimed in claim 1, wherein at least the second module has wheel sensors for detecting a wheel speed, said wheel sensors by way of a communications link being configured to transmit wheel rotational speed signals generated from the detected wheel speed, or the detected wheel speed, to the first control apparatus.

9. The brake system as claimed in claim 1, wherein the first control apparatus, in a third event, by means of the first pressure supply unit, is configured to control the pressure buildup and the pressure dissipation, so as to implement a 1-channel ABS while using wheel rotational speed sensors, and/or in a fourth event is configured to implement an intermittent brake by modulating the pressure between two fixedly adjusted pressure levels in two brake circuits.

10. The brake system as claimed in claim 1, wherein at least one pressure sensor for detecting a brake pressure within the at least one brake circuit is provided.

11. The brake system as claimed in claim 1, wherein the first module comprises:

a rotary pump, in the form of a 1-piston pump or a 3-piston pump, for building up pressure and dissipating pressure; and a solenoid valve hydraulically connected to a reservoir.

12. The brake system as claimed in claim 1, wherein the first pressure supply unit is configured as a gear pump for building up pressure and dissipating pressure.

13. The brake system as claimed in claim 12, wherein the gear pump is controlled while using a pressure transducer or as a function of a measurement of a phase current of the electromotive drive of the gear pump, and of an angle of a rotor of the electromotive drive.

14. The brake system as claimed in claim 1, wherein at least one third isolation valve is provided, said third isolation valve being disposed and configured in such a manner that, in a closed state of the third isolation valve, the first brake circuit is hydraulically decoupled from the first pressure supply unit and a third pressure supply unit disposed in the first module.

15. The brake system as claimed in claim 1, wherein the first hydraulic line and/or the second hydraulic line are respectively connected to a reservoir by way of a respective suction valve.

16. The brake system as claimed in claim 1, wherein an activation element, in the form of a brake pedal, is disposed on a third pressure supply unit disposed in the first module, wherein the third pressure supply unit comprises a master brake cylinder having a single piston that is activatable by means of the activation element.

17. The brake system as claimed in claim 1, wherein at least some of the isolation valves of the second module are disposed and configured for establishing a hydraulic connection between outlet valves as the brake pressure adjustment valves and the connection points.

18. The brake system as claimed in claim 1, wherein detecting the first event comprises detecting an at least partial failure of the second pressure supply unit.

19. A method for controlling a brake system including:

a first module, comprising a first pressure supply unit having an electromotive drive and a first control apparatus for controlling the first pressure supply unit, wherein the first module is configured to apply a pressurizing medium to at least one first brake circuit by way of a first connection point, and at least one second brake circuit by way of a second connection point, wherein the brake circuits are assigned wheel brakes, a second module, comprising a second pressure supply unit, in the form of a motor/pump unit, isolation valves as well as brake pressure adjustment valves, comprising outlet valves and inlet valves, configured to adjust pressures in the wheel brakes, and a second control apparatus for controlling the brake pressure adjustment valves, a detection unit configured to detect a first event, wherein, to provide an anti-lock braking system (ABS) function during the first event, the brake system is configured to implement a wheel-individual and/or selective adjustment of the pressures in the wheel brakes while actuating at least one of the brake pressure adjustment valves of the second module, wherein the first pressure supply unit is controlled such that the first pressure supply unit, when releasing pressure from the wheel brakes via respective ones of the outlet valves associated with respective ones of the wheel brakes by opening the outlet valves to provide the ABS function, generates a pressure sink having a lower pressure than the pressures in the wheel brakes, said method comprising:

controlling the first pressure supply unit of the first module by means of the first control apparatus in a normal operation, controlling a multiplicity of the brake pressure adjustment valves in the second module in the normal operation, detecting a first event corresponding to a partial failure of the second module, and controlling the brake system in the first event in such a manner that for providing an ABS braking operation and/or a yaw torque intervention, a wheel-individual and/or selective adjustment of the pressures in the wheel brakes takes place while actuating the first pressure supply unit and at least one of the brake pressure adjustment valves of the second module and/or the isolation valves of the second module.

20. The method as claimed in claim 19, comprising:

detecting a second event corresponding to a total failure of the second pressure supply unit, controlling the first pressure supply unit and at least two isolation valves of the first module in such a manner that, in the second event, a brake circuit-individual pressure feedback control is implemented in the at least two brake circuits.

21. The method as claimed in claim 20, comprising:

detecting a non-homogenous road condition, controlling the first pressure supply unit in the second event in such a manner that, in the non-homogenous road condition, a wheel brake of a selected one of the brake circuits that has a coefficient of friction that is higher in comparison to another wheel brake is utilized for determining a target brake pressure.

22. The method as claimed in claim 20, comprising:

detecting a third event corresponding to a total failure of the second pressure supply unit and/or a failure of wheel sensors, controlling the first pressure supply unit in the third event in such a manner that a 1-channel ABS is implemented, or in a fourth event an intermittent brake is implemented by modulating the pressure between two predefined pressure levels in at least one of the brake circuits.

23. The method as claimed in claim 19, comprising:

determining a first wheel blocking pressure on a first wheel brake which is assigned to one of the two brake circuits;

determining a second wheel blocking pressure on a wheel brake which is assigned to the same brake circuit, wherein a non-homogenous road condition is detected when the first and the second wheel blocking pressures differ by more than 30 percent.

* * * * *